(12) United States Patent
Rothkopf et al.

(10) Patent No.: US 11,908,086 B2
(45) Date of Patent: Feb. 20, 2024

(54) TECHNIQUES FOR PARTICIPATION IN A SHARED SETTING

(71) Applicant: Apple Inc., Cupertino, CA (US)

(72) Inventors: Fletcher R. Rothkopf, Los Altos, CA (US); Grant H. Mulliken, Los Gatos, CA (US); James Williams Charles Vandyke, Sydney (AU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/900,657

(22) Filed: Aug. 31, 2022

(65) Prior Publication Data

US 2023/0260217 A1    Aug. 17, 2023

Related U.S. Application Data

(63) Continuation of application No. 17/359,169, filed on Jun. 25, 2021, now abandoned, which is a continuation of application No. PCT/US2020/027186, filed on Apr. 8, 2020.

(60) Provisional application No. 62/832,161, filed on Apr. 10, 2019.

(51) Int. Cl.
| | |
|---|---|
| *G06T 19/00* | (2011.01) |
| *G06F 3/01* | (2006.01) |
| *G06F 3/14* | (2006.01) |
| *G06T 13/20* | (2011.01) |
| *G06T 13/40* | (2011.01) |

(52) U.S. Cl.
CPC .............. *G06T 19/00* (2013.01); *G06F 3/013* (2013.01); *G06F 3/017* (2013.01); *G06F 3/1454* (2013.01); *G06T 13/205* (2013.01); *G06T 13/40* (2013.01); *G06T 2219/024* (2013.01)

(58) Field of Classification Search
CPC .......... G06F 3/011; G06F 3/012; G06F 3/013; G06F 3/04815; G06T 19/006; G06T 2219/024; G06T 13/40; H04N 7/157; A63F 2300/5553; A63F 2300/8082; A63F 13/87; A63F 2300/572; H04L 67/131; H04L 65/403; G06V 20/20
See application file for complete search history.

(56) References Cited

U.S. PATENT DOCUMENTS

| | | | | |
|---|---|---|---|---|
| 5,736,982 A | * | 4/1998 | Suzuki | ..................... H04N 7/15 715/848 |
| 8,156,184 B2 | * | 4/2012 | Kurata | .................... G10L 17/00 715/708 |
| 10,905,956 B2 | * | 2/2021 | Fajt | ....................... A63F 13/212 |

(Continued)

FOREIGN PATENT DOCUMENTS

WO    2019/067780 A1    4/2019

OTHER PUBLICATIONS

International Preliminary Report on Patentability received for PCT Patent Application No. PCT/US2020/027186, dated Oct. 21, 2021, 10 pages.

(Continued)

*Primary Examiner* — Koosha Sharifi-Tafreshi
(74) *Attorney, Agent, or Firm* — DLA Piper LLP (US)

(57) ABSTRACT

In accordance with some embodiments, an exemplary process for initializing members of a shared enhanced reality setting is described. In accordance with some embodiments, an exemplary process for forming a private sub-space and example features of the private sub-space is described.

21 Claims, 13 Drawing Sheets

(56) References Cited

U.S. PATENT DOCUMENTS

| | | | |
|---|---|---|---|
| 2009/0089685 A1* | 4/2009 | Mordecai | G06F 21/6245 |
| | | | 348/E7.078 |
| 2009/0276707 A1* | 11/2009 | Hamilton | H04L 51/222 |
| | | | 715/753 |
| 2009/0303984 A1 | 12/2009 | Clark et al. | |
| 2010/0169796 A1* | 7/2010 | Lynk | A63F 13/45 |
| | | | 715/757 |
| 2012/0122525 A1 | 5/2012 | Miller et al. | |
| 2012/0173631 A1 | 7/2012 | Yoakum et al. | |
| 2013/0150133 A1 | 6/2013 | Alameh et al. | |
| 2015/0215581 A1 | 7/2015 | Barzuza et al. | |
| 2015/0302869 A1 | 10/2015 | Tomlin et al. | |
| 2015/0309569 A1* | 10/2015 | Kohlhoff | G06V 40/193 |
| | | | 382/103 |
| 2016/0093108 A1 | 3/2016 | Mao et al. | |
| 2018/0005429 A1 | 1/2018 | Osman et al. | |
| 2018/0034867 A1* | 2/2018 | Zahn | G06F 3/04842 |
| 2018/0270571 A1 | 9/2018 | Di Censo et al. | |
| 2018/0316893 A1 | 11/2018 | Rosenberg et al. | |
| 2019/0391637 A1* | 12/2019 | Taylor | G06F 3/013 |
| 2021/0327140 A1 | 10/2021 | Rothkopf et al. | |

OTHER PUBLICATIONS

International Search Report and Written Opinion received for PCT Patent Application No. PCT/US2020/027186, dated Sep. 2, 2020, 14 pages.

Invitation to Pay Additional Fees and Partial International Search Report received for PCT Patent Application No. PCT/US2020/027186, dated Jul. 10, 2020, 8 pages.

Non-Final Office Action received for U.S. Appl. No. 17/359,169, dated Apr. 5, 2022, 18 pages.

\* cited by examiner

TECHNIQUES FOR PARTICIPATION IN A SHARED SETTING

CROSS-REFERENCE TO RELATED APPLICATIONS

This application is a continuation of U.S. patent application Ser. No. 17/359,169, entitled "TECHNIQUES FOR PARTICIPATION IN A SHARED SETTING," filed Jun. 25, 2021, which is a continuation of PCT Application No. PCT/US2020/27186, entitled "TECHNIQUES FOR PARTICIPATION IN A SHARED SETTING," filed Apr. 8, 2020, which claims priority to U.S. Provisional Patent Application Ser. No. 62/832,161, entitled "TECHNIQUES FOR PARTICIPATION IN A SHARED COMPUTER-SIMULATED REALITY ENVIRONMENT," filed Apr. 10, 2019, the contents of which are hereby incorporated by reference in their entirety.

FIELD

The present disclosure relates generally to enhanced reality (ER) settings, and more specifically to methods and techniques for managing members of a shared ER setting.

BACKGROUND

Enhanced reality (ER) settings provide a convenient platform for a plurality of users to, together, experience and interact with a virtual, enhanced reality setting that is different from the physical setting. However, existing techniques for managing members of a shared ER setting can be cumbersome and inefficient. Thus, a method is needed that enables users to quickly and easily enter into a shared ER setting and to conveniently manage different types of conversations within the shared ER setting.

BRIEF SUMMARY

In accordance with some embodiments, a method performed at a first electronic device having one or more sensors and one or more displays and adapted to communicate with a second electronic device is described. The method comprises: receiving a request to present an enhanced reality setting and determining whether a first user of the first electronic device and a second user of the second electronic device satisfy a physical interaction criterion. The method further comprises: in accordance with a determination that the physical interaction criterion is satisfied, presenting the enhanced reality setting, wherein presenting the enhanced reality setting includes displaying an avatar representing the second user in the enhanced reality setting; and in accordance with a determination that the physical interaction criterion is not satisfied, presenting the enhanced reality setting without the avatar representing the second user.

In accordance with some embodiments, a first electronic device comprising one or more sensors; one or more displays; a wireless communication radio configured to communicate with a second electronic device; one or more processors; and memory storing one or more programs configured to be executed by the one or more processors is described. The one or more programs include instructions for: receiving a request to present an enhanced reality setting and determining whether a first user of the first electronic device and a second user of the second electronic device satisfy a physical interaction criterion. The one or more programs further include instructions for: in accordance with a determination that the physical interaction criterion is satisfied, presenting the enhanced reality setting, wherein presenting the enhanced reality setting includes displaying an avatar representing the second user in the enhanced reality setting; and in accordance with a determination that the physical interaction criterion is not satisfied, presenting the enhanced reality setting without the avatar representing the second user.

In accordance with some embodiments, a non-transitory computer-readable storage medium storing one or more programs configured to be executed by one or more processors of a first electronic device having one or more sensors and one or more displays and adapted to communicate with a second electronic device is described. The one or more programs include instructions for: receiving a request to present an enhanced reality setting and determining whether a first user of the first electronic device and a second user of the second electronic device satisfy a physical interaction criterion. The one or more programs further include instructions for: in accordance with a determination that the physical interaction criterion is satisfied, presenting the enhanced reality setting, wherein presenting the enhanced reality setting includes displaying an avatar representing the second user in the enhanced reality setting; and in accordance with a determination that the physical interaction criterion is not satisfied, presenting the enhanced reality setting without the avatar representing the second user.

In accordance with some embodiments, a method is described. The method comprises: displaying an enhanced reality setting, wherein the enhanced reality setting includes a plurality of avatars. The method further comprises, while displaying the enhanced reality setting: selecting a first avatar of the plurality of avatars as a recipient of received audio input; selecting a second avatar of the plurality of avatars as a non-recipient of the received audio input; receiving, via a microphone, audio input; causing playback of audio corresponding to the audio input and a corresponding visual avatar movement for the first avatar; and forgoing causing playback of the audio for the second avatar.

In accordance with some embodiments, a system comprising one or more processors of one or more electronic devices and memory storing one or more programs configured to be executed by the one or more processors is described. The one or more programs include instructions for: displaying an enhanced reality setting, wherein the enhanced reality setting includes a plurality of avatars. The one or more programs further include instructions for, while displaying the enhanced reality setting: selecting a first avatar of the plurality of avatars as a recipient of received audio input; selecting a second avatar of the plurality of avatars as a non-recipient of the received audio input; receiving, via a microphone, audio input; causing playback of audio corresponding to the audio input and a corresponding visual avatar movement for the first avatar; and forgoing causing playback of the audio for the second avatar.

In accordance with some embodiments, a non-transitory computer-readable storage medium storing one or more programs configured to be executed by one or more processors of one or more electronic devices is described. The one or more programs include instructions for: displaying an enhanced reality setting, wherein the enhanced reality setting includes a plurality of avatars. The one or more programs further include instructions for, while displaying the enhanced reality setting: selecting a first avatar of the plurality of avatars as a recipient of received audio input; selecting a second avatar of the plurality of avatars as a non-recipient of the received audio input; receiving, via a microphone, audio input; causing playback of audio corresponding to the audio input and a corresponding visual avatar movement for the first avatar; and forgoing causing playback of the audio for the second avatar.

BRIEF DESCRIPTION OF THE FIGURES

For a better understanding of the various described embodiments, reference should be made to the Description below, in conjunction with the following drawings in which like reference numerals refer to corresponding parts throughout the figures.

DESCRIPTION

Figure 1A:
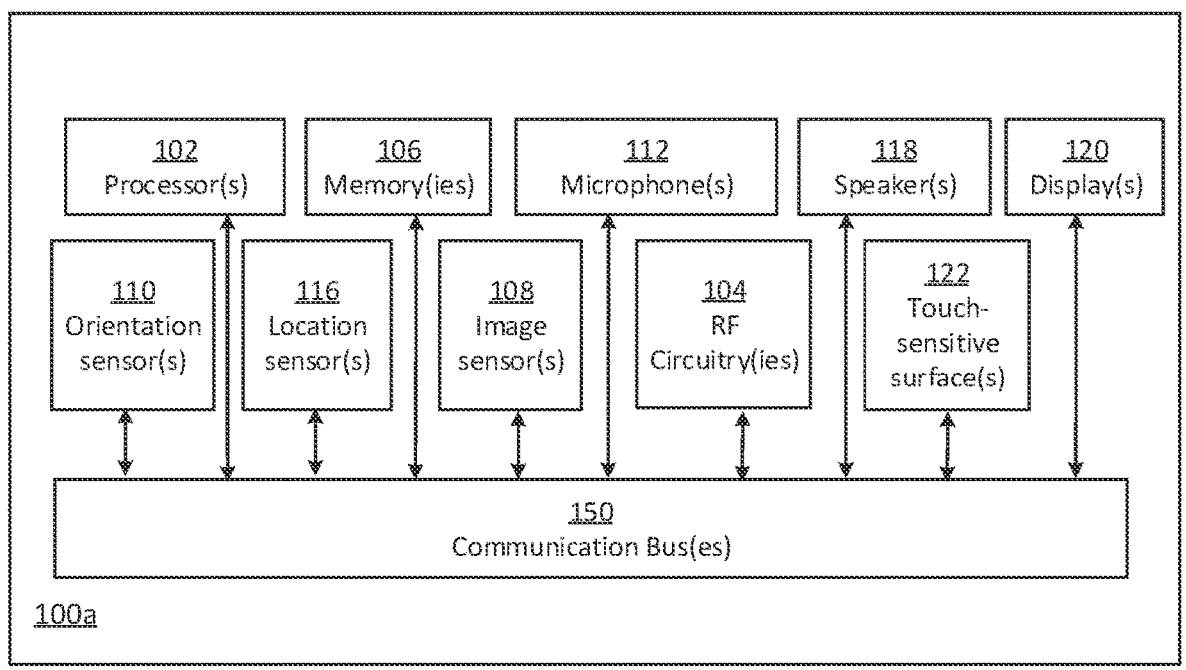
FIGS. 1A-1B depict exemplary systems for use in various computer enhanced reality technologies, including virtual reality and mixed reality.

Various examples of electronic systems and techniques for using such systems in relation to various enhanced reality technologies are described.

A physical setting refers to a world with which various persons can sense and/or interact without use of electronic systems. Physical settings, such as a physical park, include physical elements, such as, for example, physical wildlife, physical trees, and physical plants. Persons can directly sense and/or otherwise interact with the physical setting, for example, using one or more senses including sight, smell, touch, taste, and hearing.

An enhanced reality (ER) setting, in contrast to a physical setting, refers to an entirely (or partly) computer-produced setting that various persons, using an electronic system, can sense and/or otherwise interact with. In ER, a person's movements are in part monitored, and, responsive thereto, at least one attribute corresponding to at least one virtual object in the ER setting is changed in a manner that is consistent with one or more physical laws. For example, in response to an ER system detecting a person looking upward, the ER system may adjust various audio and graphics presented to the person in a manner consistent with how such sounds and appearances would change in a physical setting. Adjustments to attribute(s) of virtual object(s) in an ER setting also may be made, for example, in response to representations of movement (e.g., voice commands).

A person may sense and/or interact with an ER object using one or more senses, such as sight, smell, taste, touch, and sound. For example, a person may sense and/or interact with objects that create a multi-dimensional or spatial acoustic setting. Multi-dimensional or spatial acoustic settings provide a person with a perception of discrete acoustic sources in multi-dimensional space. Such objects may also enable acoustic transparency, which may selectively incorporate audio from a physical setting, either with or without computer-produced audio. In some ER settings, a person may sense and/or interact with only acoustic objects.

Virtual reality (VR) is one example of ER. A VR setting refers to an enhanced setting that is configured to only include computer-produced sensory inputs for one or more senses. A VR setting includes a plurality of virtual objects that a person may sense and/or interact with. A person may sense and/or interact with virtual objects in the VR setting through a simulation of at least some of the person's actions within the computer-produced setting, and/or through a simulation of the person or her presence within the computer-produced setting.

Mixed reality (MR) is another example of ER. An MR setting refers to an enhanced setting that is configured to integrate computer-produced sensory inputs (e.g., virtual objects) with sensory inputs from the physical setting, or a representation of sensory inputs from the physical setting. On a reality spectrum, an MR setting is between, but does not include, a completely physical setting at one end and a VR setting at the other end.

In some MR settings, computer-produced sensory inputs may be adjusted based on changes to sensory inputs from the physical setting. Moreover, some electronic systems for presenting MR settings may detect location and/or orientation with respect to the physical setting to enable interaction between real objects (i.e., physical elements from the physical setting or representations thereof) and virtual objects. For example, a system may detect movements and adjust computer-produced sensory inputs accordingly, so that, for example, a virtual tree appears fixed with respect to a physical structure.

Augmented reality (AR) is an example of MR. An AR setting refers to an enhanced setting where one or more virtual objects are superimposed over a physical setting (or representation thereof). As an example, an electronic system may include an opaque display and one or more imaging sensors for capturing video and/or images of a physical setting. Such video and/or images may be representations of the physical setting, for example. The video and/or images are combined with virtual objects, wherein the combination is then displayed on the opaque display. The physical setting may be viewed by a person, indirectly, via the images and/or video of the physical setting. The person may thus observe the virtual objects superimposed over the physical setting. When a system captures images of a physical setting, and displays an AR setting on an opaque display using the captured images, the displayed images are called a video pass-through. Alternatively, a transparent or semi-transparent display may be included in an electronic system for displaying an AR setting, such that an individual may view the physical setting directly through the transparent or semi-transparent displays. Virtual objects may be displayed on the semi-transparent or transparent display, such that an individual observes virtual objects superimposed over a physical setting. In yet another example, a projection system may be utilized in order to project virtual objects onto a physical setting. For example, virtual objects may be projected on a physical surface, or as a holograph, such that an individual observes the virtual objects superimposed over the physical setting.

An AR setting also may refer to an enhanced setting in which a representation of a physical setting is modified by computer-produced sensory data. As an example, at least a portion of a representation of a physical setting may be graphically modified (e.g., enlarged), so that the modified portion is still representative of (although not a fully-reproduced version of) the originally captured image(s).

Alternatively, in providing video pass-through, one or more sensor images may be modified in order to impose a specific viewpoint different than a viewpoint captured by the image sensor(s). As another example, portions of a representation of a physical setting may be altered by graphically obscuring or excluding the portions.

Augmented virtuality (AV) is another example of MR. An AV setting refers to an enhanced setting in which a virtual or computer-produced setting integrates one or more sensory inputs from a physical setting. Such sensory input(s) may include representations of one or more characteristics of a physical setting. A virtual object may, for example, incorporate a color associated with a physical element captured by imaging sensor(s). Alternatively, a virtual object may adopt characteristics consistent with, for example, current weather conditions corresponding to a physical setting, such as weather conditions identified via imaging, online weather information, and/or weather-related sensors. As another example, an AR park may include virtual structures, plants, and trees, although animals within the AR park setting may include features accurately reproduced from images of physical animals.

Various systems allow persons to sense and/or interact with ER settings. For example, a head mounted system may include one or more speakers and an opaque display. As another example, an external display (e.g., a smartphone) may be incorporated within a head mounted system. The head mounted system may include microphones for capturing audio of a physical setting, and/or image sensors for capturing images/video of the physical setting. A transparent or semi-transparent display may also be included in the head mounted system. The semi-transparent or transparent display may, for example, include a substrate through which light (representative of images) is directed to a person's eyes. The display may also incorporate LEDs, OLEDs, liquid crystal on silicon, a laser scanning light source, a digital light projector, or any combination thereof. The substrate through which light is transmitted may be an optical reflector, holographic substrate, light waveguide, optical combiner, or any combination thereof. The transparent or semi-transparent display may, for example, transition selectively between a transparent/semi-transparent state and an opaque state. As another example, the electronic system may be a projection-based system. In a projection-based system, retinal projection may be used to project images onto a person's retina. Alternatively, a projection-based system also may project virtual objects into a physical setting, for example, such as projecting virtual objects as a holograph or onto a physical surface. Other examples of ER systems include windows configured to display graphics, headphones, earphones, speaker arrangements, lenses configured to display graphics, heads up displays, automotive windshields configured to display graphics, input mechanisms (e.g., controllers with or without haptic functionality), desktop or laptop computers, tablets, or smartphones.

Figure 1B:
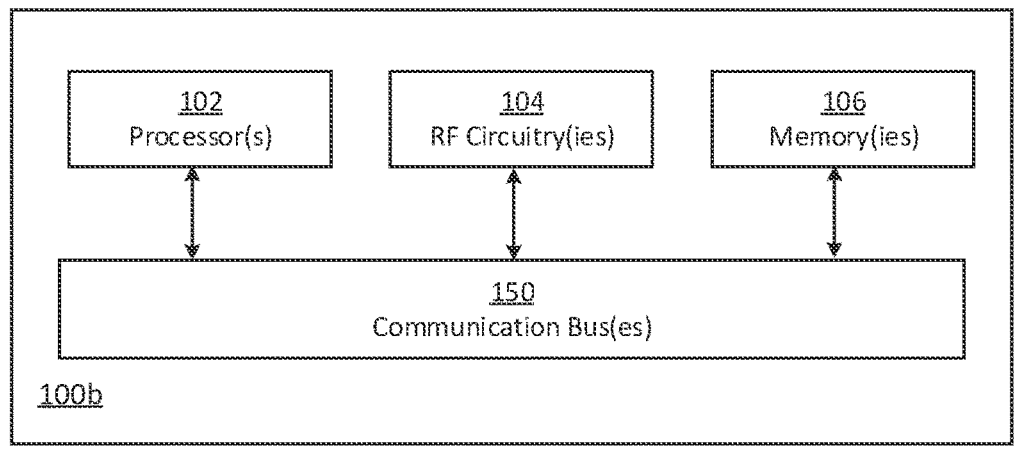
Figure 1B:
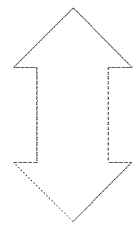
Figure 1B:
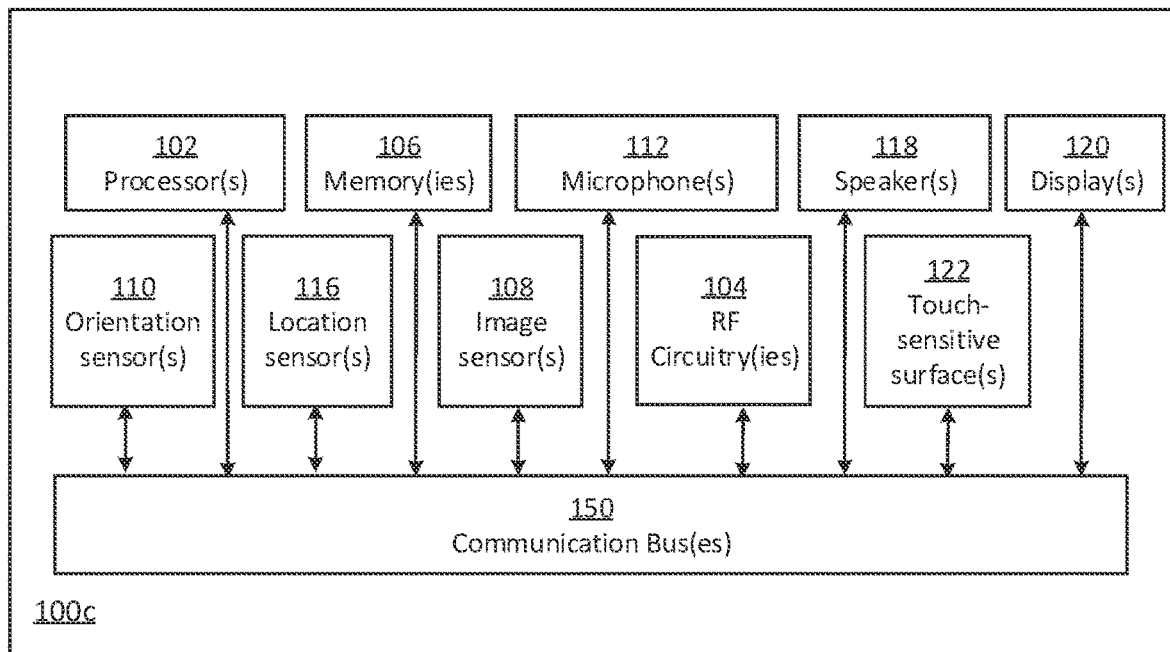

FIG. 1A and FIG. 1B depict exemplary system 100 for use in various enhanced reality technologies.

In some examples, as illustrated in FIG. 1A, system 100 includes device 100*a*. Device 100*a* includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*a*.

In some examples, elements of system 100 are implemented in a base station device (e.g., a computing device, such as a remote server, mobile device, or laptop) and other elements of system 100 are implemented in a second device (e.g., a head-mounted device). In some examples, device 100*a* is implemented in a base station device or a second device.

As illustrated in FIG. 1B, in some examples, system 100 includes two (or more) devices in communication, such as through a wired connection or a wireless connection. First device 100*b* (e.g., a base station device) includes processor(s) 102, RF circuitry(ies) 104, and memory(ies) 106. These components optionally communicate over communication bus(es) 150 of device 100*b*. Second device 100*c* (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*c*.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some examples, system 100 is a projection-based system that uses retinal projection to project images onto an individual's retina or projects virtual objects into a physical setting (e.g., onto a physical surface or as a holograph).

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some examples, system 100 includes microphones(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

FIGS. 2A-2G depict an exemplary technique for initializing members of a shared ER setting using a first electronic of a first user 202 and a second electronic device 208 of a second user 204. In some embodiments, first electronic device 206 and second electronic device 208 are similar to electronic device 100a described above with reference to FIGS. 1A-1B. In some embodiments, first electronic device 206 and/or second electronic device 208 are mobile electronic devices, such as a smartphone or a tablet computer. In some embodiments, first electronic device 206 and/or second electronic device 208 are head-mounted devices (HMD).

Figure 2A:
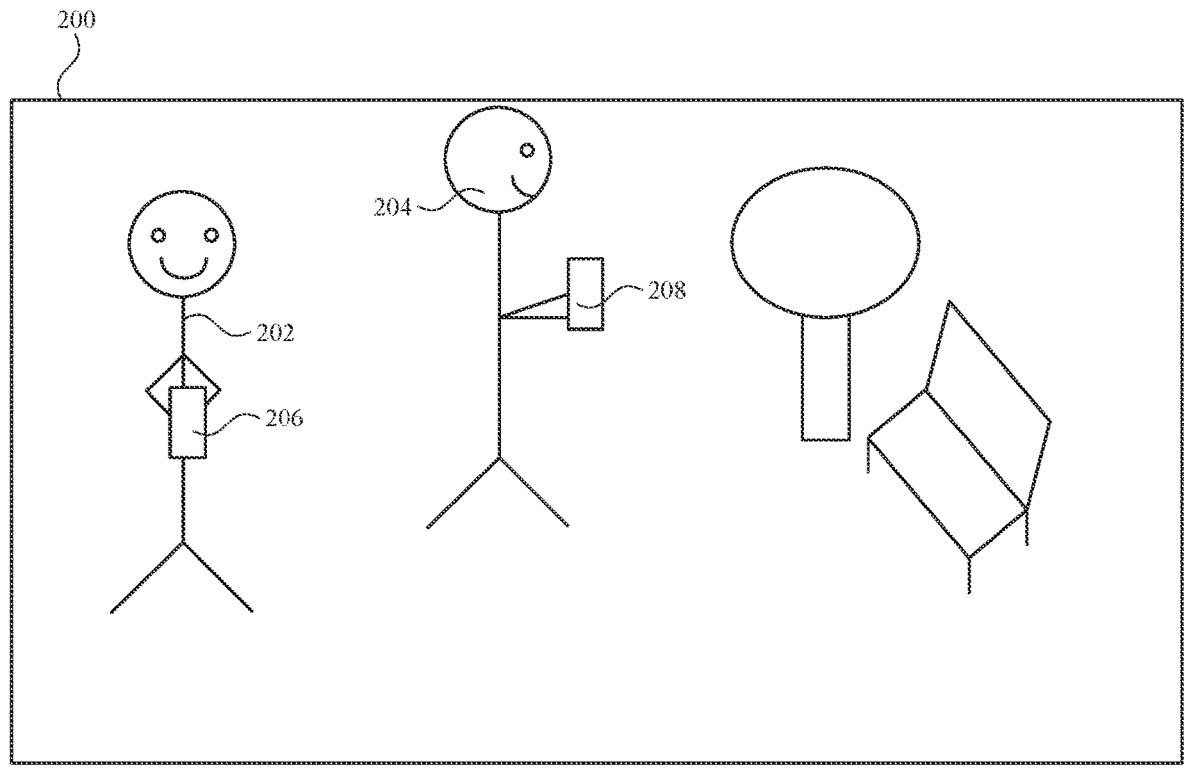
FIGS. 2A-2G depict an exemplary process for initializing members of a shared enhanced reality setting, in accordance with some embodiments.

FIG. 2A illustrates a physical setting 200 (e.g., an outdoor park), with first user 202 and second user 204 in physical setting 200, and where first user 202 is using first electronic device 206 and second user 204 is using second electronic device 208. In FIG. 2A, first user 202 and second user 204 are more than a predetermined distance (e.g., more than 5 meters, more than 3 meters, or more than 1 meter) away from one another within physical setting 200.

Figure 2B:
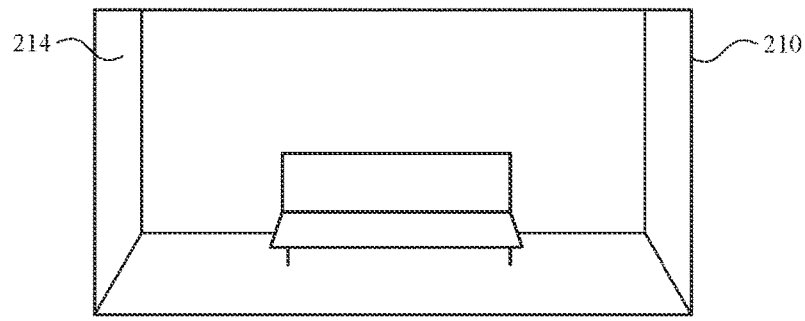
Figure 2B:
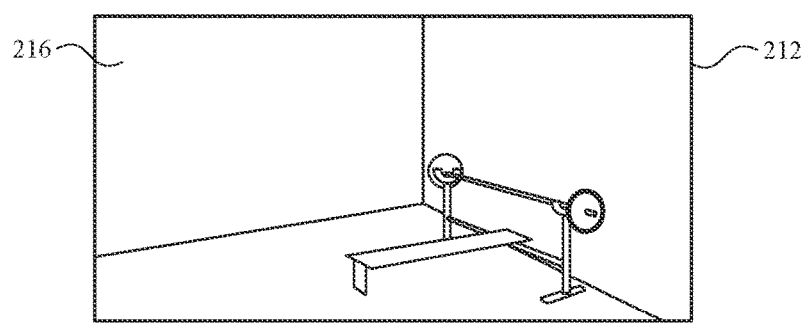

In some embodiments (e.g., while first user 202 and second user 204 are more than the predetermined distance away from one another), first electronic device 206 displays, on a display 210 of the first electronic device, an ER setting 214 (e.g., a room), as shown in FIG. 2B. Similarly (e.g., while first user 202 and second user 204 are more than the predetermined distance away from one another), second electronic device 206 displays, on a display 212 of the second electronic device, an ER setting 216 (e.g., a gym), as also shown in FIG. 2B. In FIG. 2B, ER setting 214 and ER setting 216 are different and separate enhanced reality settings that are not shared by first user 202 and second user 204.

In FIGS. 2A-2B, first user 202 and second user 204 are not sharing an ER setting. FIGS. 2C-2G illustrate different example methods for two or more users (e.g., first user 202 and second user 204) to enter into an ER setting that is shared by the two or more users.

Figure 2C:
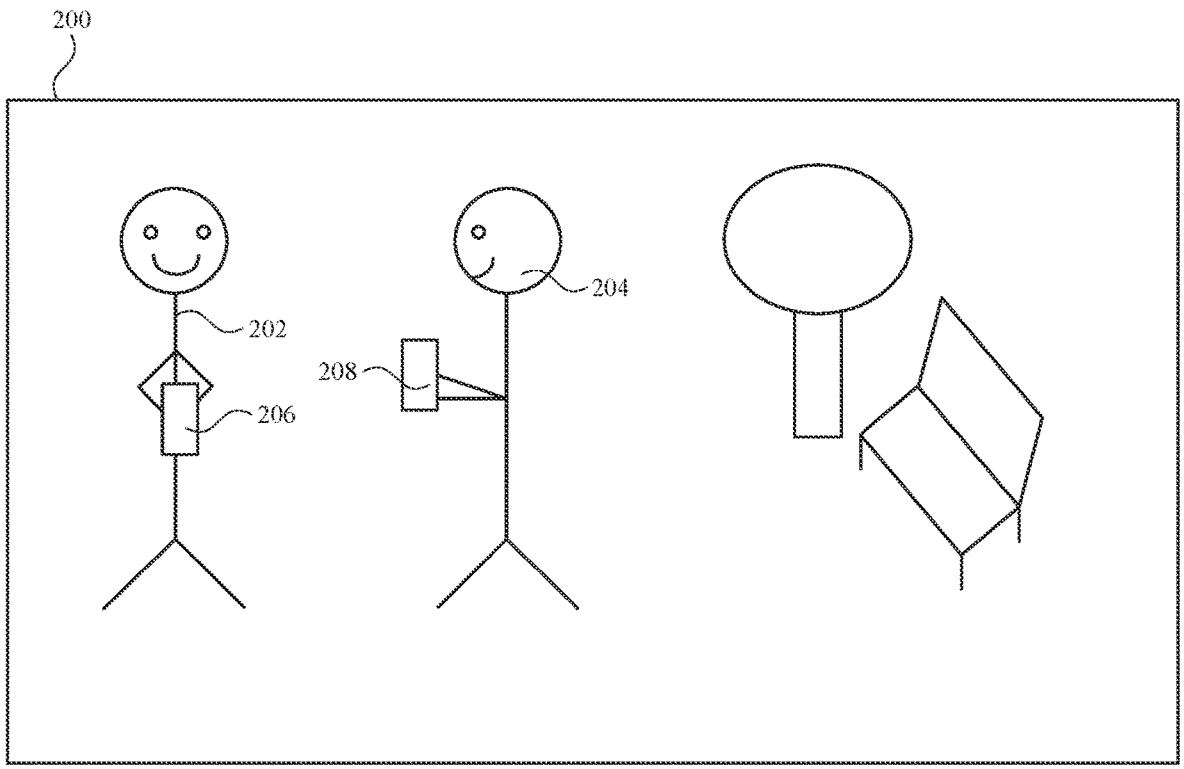

In FIG. 2C, first user 202 and second user 204 have moved from their respective positions in FIG. 2A such that the two users are within a threshold distance (e.g., 5 meters, 3 meters, 1 meter) of one another in physical setting 200. In some embodiments, in response to detecting (e.g., using one or more sensors of the device, such as an image sensor(s), orientation sensor(s), and/or a location sensor(s)) that the two users are within the predetermined threshold distance of one another, thereby satisfying a proximity criterion, first electronic device 206 displays, on display 210 of the first electronic device, an ER setting 218 (e.g., a desert) that includes a second avatar 222 corresponding to second user 204, as shown in FIG. 2G.

Figure 2D:
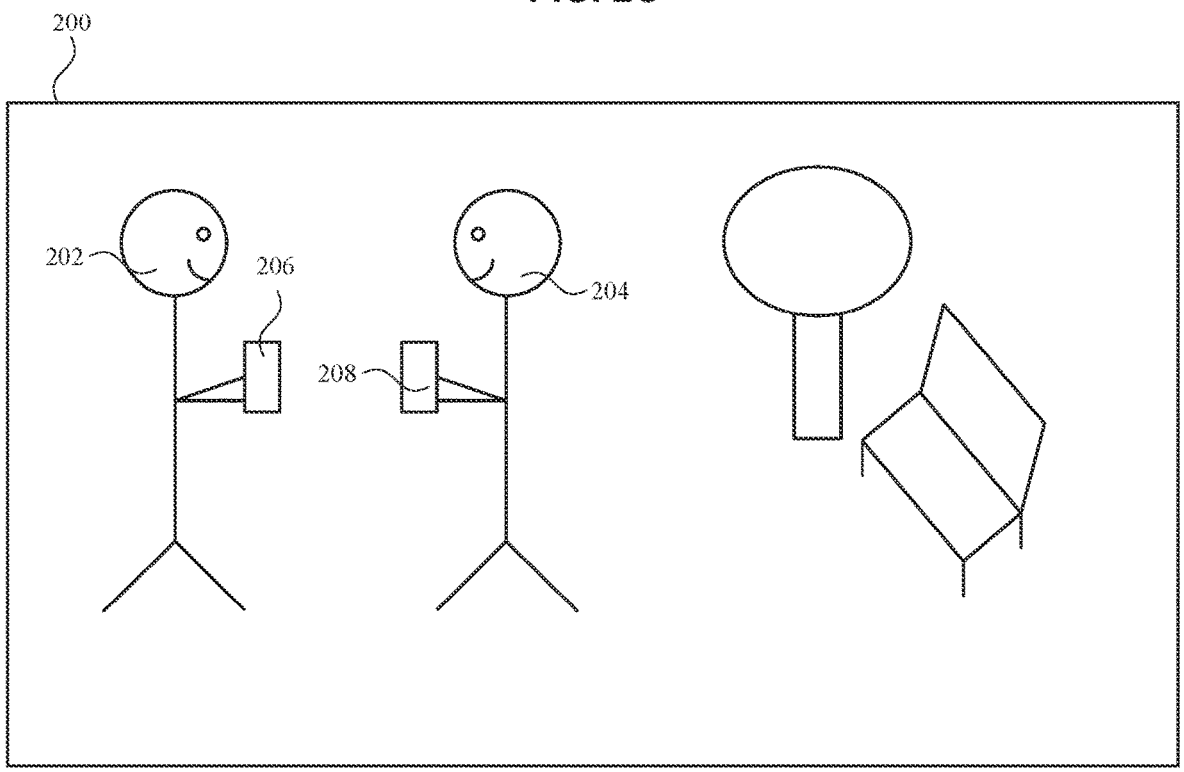
Figure 2E:
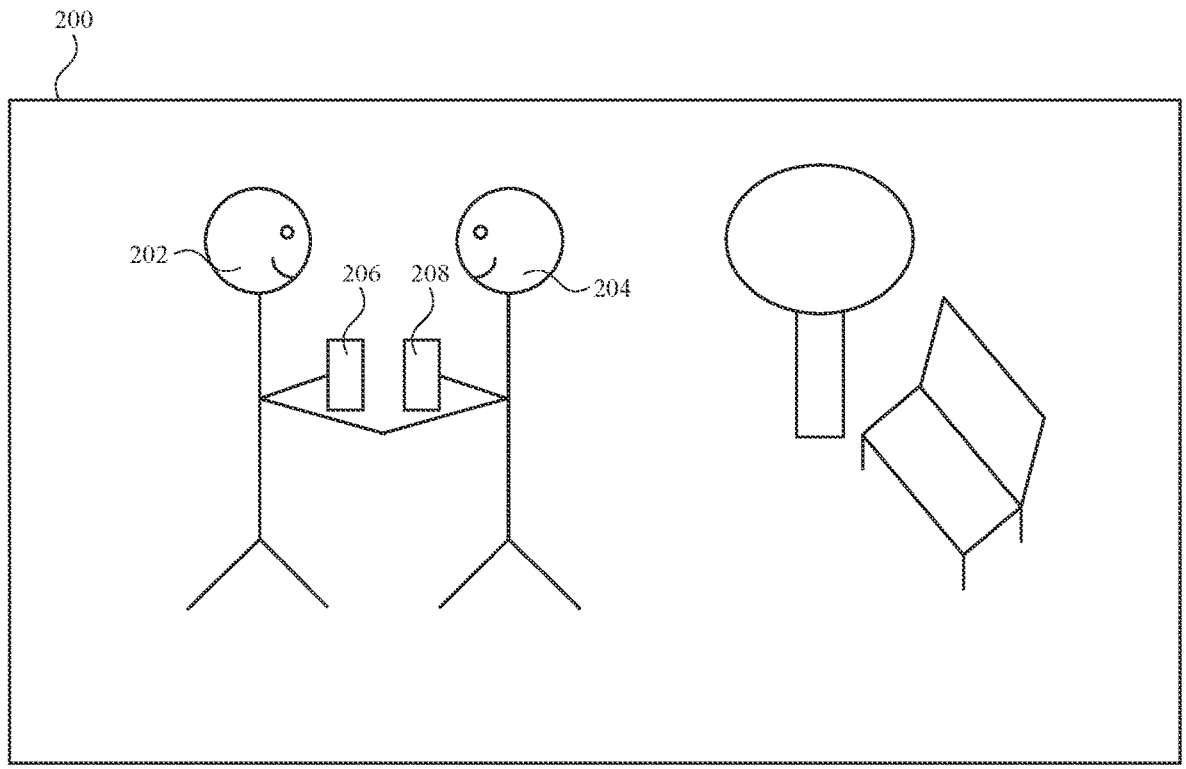
Figure 2F:
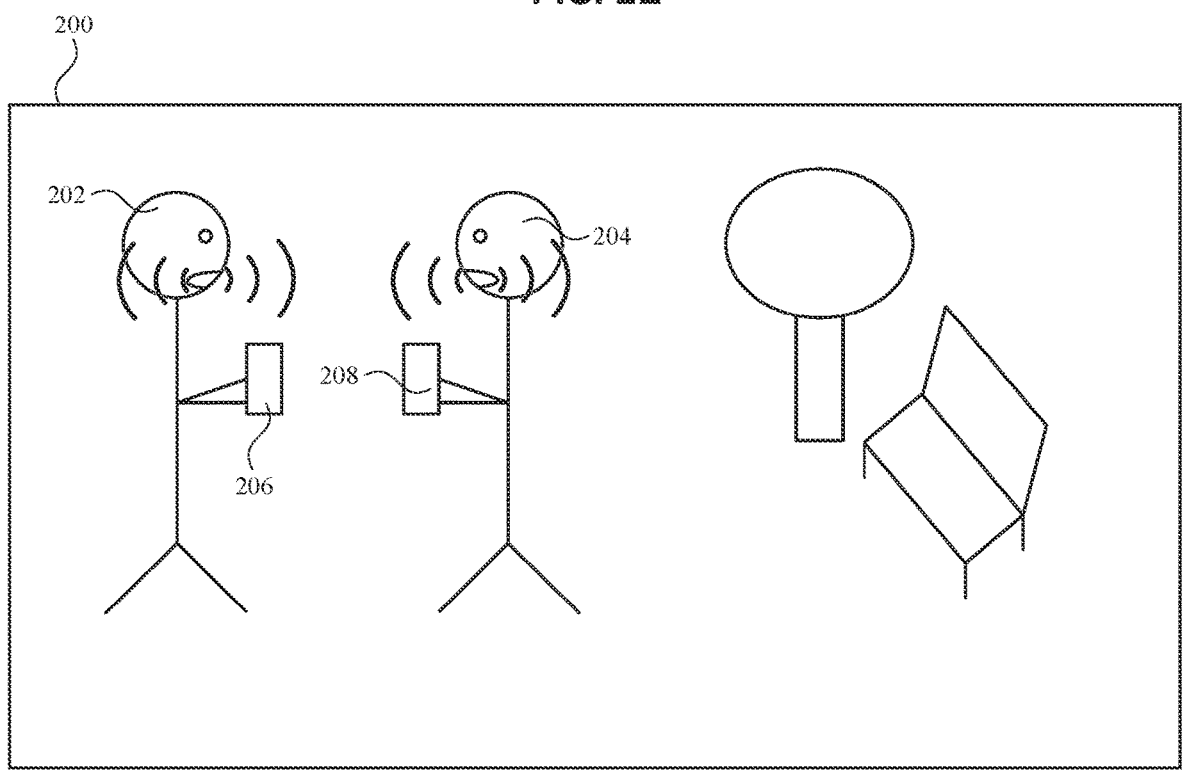
Figure 2G:
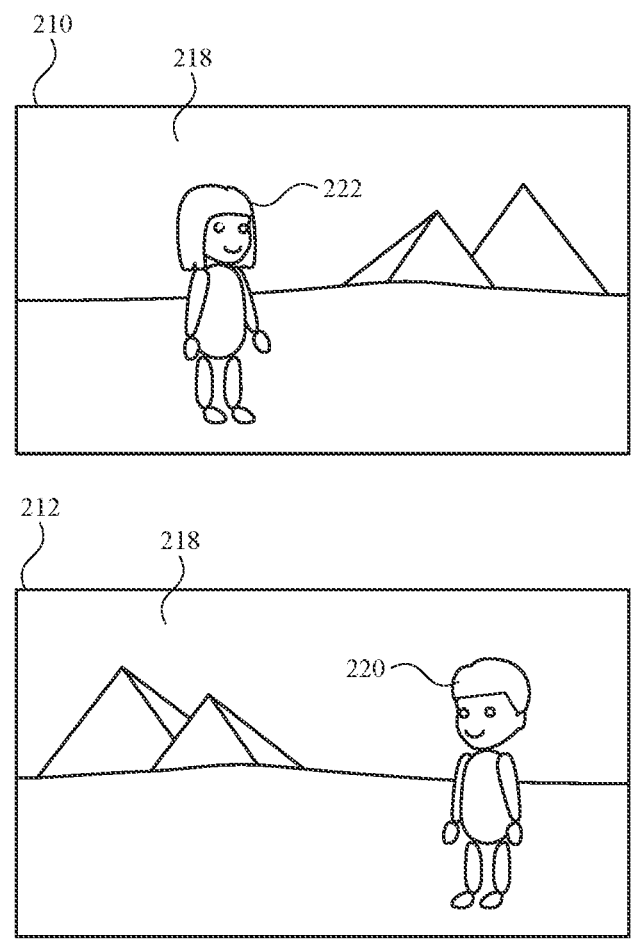

Likewise, in response to detecting (e.g., using one or more sensors of the device, such as an image sensor(s), orientation sensor(s), and/or a location sensor(s)) that the two users are within the predetermined threshold distance of one another, thereby satisfying the proximity criterion, second electronic device 208 displays, on display 212 of the second electronic device, ER setting 218 (e.g., a desert) that includes a first avatar 220 corresponding to first user 202, as also shown in FIG. 2G. In this way, when first electronic device 206 and second electronic device 208 determines that they are within the threshold distance of one another in the physical setting, the devices provide their respective users with a shared ER setting in which the users can interact with one another using avatars.

In some embodiments, providing the respective users with the shared ER setting in which the users can interact with one another using avatars comprises second user 204 appearing as an avatar in the existing ER setting (e.g., ER setting 214) that is provided by first electronic device 206 to first user 202. That is, in some embodiments, in response to detecting that the two users are within the predetermined threshold distance of one another, thereby satisfying the proximity criterion, second electronic device 208 displays, on display 212 of the second electronic device, ER setting 214 (e.g., a room) that includes first avatar 220 corresponding to first user 202. Thus, in some embodiments, second user 204 appears as an avatar in the existing ER setting (e.g., ER setting 214) that is provided by first electronic device 206 to first user 202. In other embodiments, devices 206 and 208 together provide a new ER setting (e.g., ER setting 218) in which both users 202 and 204 participate via avatars.

Optionally, in some embodiments (e.g., in response to detecting that the two users are within the predetermined threshold distance of one another), second electronic device 208 first displays, on display 212, a user interface affordance alerting second user 204 to the presence of first user 202 of first electronic device 206 within the predetermined threshold distance in the physical setting without displaying a shared ER setting. In some embodiments, in response to detecting second user 204's confirmation (e.g., detecting the user's selection of the user interface affordance), second electronic device 208 enables second user 204 to participate in a shared ER setting with user 202 (e.g., share ER setting 214 with first user 202).

In some embodiments, first electronic device 206 receives a request from first user 202 to initialize an ER setting while the device is not displaying an ER setting (e.g., because the device is in an off state or an inactive state). In some embodiments, in response to receiving the request from first user 202 to initialize an ER setting while the device is not already displaying an ER setting, first electronic device 206 detects for whether another device (e.g., second electronic device 208) is within a predetermined distance from first electronic device 206 such that the proximity criterion is satisfied. In some embodiments, in response to detecting that the proximity criterion is satisfied with another device (e.g., second electronic device 208), first electronic device 206 displays an ER setting (e.g., ER setting 218) that is shared by the user of the other device (e.g., second user 204), and thus includes an avatar corresponding to the user of the other device (e.g., avatar 222 of second user 204). Alternatively, in other embodiments, in response to detecting that the proximity criterion is satisfied with another device (e.g., second electronic device 208), first electronic device 206 displays, on display 210, a user interface affordance for proceeding with the initiation of the ER setting (e.g., ER setting 218) that is shared by the user of the other device (e.g., second user 204) without first displaying the shared ER setting, and displays the shared ER setting (e.g., ER setting 218) in response to detecting first user 202's selection or activation of the user interface affordance. In some embodiments, if first user 202's selection or activation of the user interface affordance is not detected (e.g., within a predetermined amount of time), first electronic device 206 forgoes displaying the shared ER setting (e.g., ER setting 218). In some examples, the user interface affordance for proceeding with the initiation of the shared ER setting includes an indication that another user (e.g., second user 204) is nearby and asks whether to initialize a shared ER setting that includes the other user detected nearby.

FIG. 2D illustrates another exemplary method for two or more users (e.g., first user 202 and second user 204) to enter into an ER setting that is shared by the two or more users. In FIG. 2D, first electronic device 206 detects (e.g., using an eye tracking sensor, an orientation sensor, and/or a location sensor) that first user 202 is gazing at second user 204 (e.g., looking at second user 204 for at least a predetermined time period, such as 10 seconds, 5 seconds, or 3 seconds).

In some embodiments, in response to detecting the gaze by first user 202 directed to second user 204, if first electronic device 206 was displaying an ER setting that was not shared with second user 204 (e.g., ER setting 214), first electronic device 206 transitions to displaying, on display 210 of the device, an ER setting that is shared with second user 204 (e.g., ER setting 218), the target of first user 202's gaze, where the ER setting that is shared with second user 204 includes an avatar (e.g., avatar 222) corresponding to second user 204 within the shared ER setting. Alternatively, in other embodiments, in response to detecting the gaze by first user 202 directed to second user 204, if first electronic device 206 was displaying an ER setting that was not shared with second user 204 (e.g., ER setting 214), first electronic device 206 displays, on display 210, a user interface affordance for transitioning to the ER setting that is shared with second user 204 (e.g., ER setting 218), the target of first user 202's gaze, without first displaying the shared ER setting, and transitions to displaying the shared ER setting (e.g., ER setting 218) in response to detecting first user 202's selection or activation of the user interface affordance. In some embodiments, if first user 202's selection or activation of the user interface affordance is not detected (e.g., within a predetermined amount of time), first electronic device 206 forgoes transitioning to the shared ER setting (e.g., ER setting 218) and instead maintains display of the ER setting (e.g., ER setting 214) that was being displayed. In some examples, the user interface affordance for proceeding with the initiation of the shared ER setting includes an indication that another user (e.g., second user 204) is nearby and asks whether to initialize a shared ER setting that includes the other user detected nearby.

On the other hand, in some embodiments, in response to detecting that the gaze by first user 202 directed to second user 204, if first electronic device 206 was not displaying an ER setting, first electronic device 206 displays, on display 210 of the device, the ER setting shared with second user 204 (e.g., ER setting 218).

Further, in some embodiments, in response to detecting the gaze by first user 202 directed to second user 204, first electronic device 206 causes second electronic device 208 to also display the ER setting that is shared between first user 202 and second user 204 (e.g., ER setting 218). As such, from the perspective of second user 204, second electronic device 208 displays, on display 212 of the device, the ER setting that is shared with first user 202 (e.g., ER setting 218) that includes an avatar (e.g., avatar 220) corresponding to first user 202 within the shared ER setting.

FIG. 2E illustrates another example method for two or more users (e.g., first user 202 and second user 204) to enter into an ER setting that is shared by the two or more users. In FIG. 2E, first electronic device 206 detects (e.g., using one or more cameras of the device; using one or more downward-facing cameras of the device if the device is a HMD) that first user 202 is engaging in a handshake with second user 204. In some embodiments, in response to detecting that first user 202 is engaging in the handshake with second user 204, if first electronic device 206 was displaying an ER setting that was not shared with second user 204 (e.g., ER setting 214), first electronic device 206 transitions to displaying an ER setting that is shared with second user 204 (e.g., ER setting 218), where the ER setting that is shared with second user 204 includes an avatar (e.g., avatar 222) corresponding to second user 204 within the shared ER setting.

On the other hand, in some embodiments, in response to detecting that first user 202 is engaging in the handshake with second user 204, if first electronic device 206 was not displaying an ER setting, first electronic device 206 displays, on display 210 of the device, the ER setting that is shared with second user 204 (e.g., ER setting 218).

Similarly, in FIG. 2E, second electronic device 206 detects (e.g., using one or more cameras of the device; using one or more downward-facing cameras of the device if the device is a HMD) that second user 204 is engaging in the handshake with first user 202. In some embodiments, in response to detecting that second user 204 is engaging in the handshake with first user 202, if second electronic device 208 was displaying an ER setting that was not shared with first user 202 (e.g., ER setting 218), second electronic device 208 transitions to displaying an ER setting that is shared with first user 202 (e.g., ER setting 218), where the ER setting that is shared with first user 202 includes an avatar (e.g., avatar 220) corresponding to first user 202 within the shared ER setting.

On the other hand, in some embodiments, in response to detecting that second user 204 is engaging in the handshake with first user 202, if second electronic device 208 was not displaying an ER setting, second electronic device 208 displays, on display 212 of the device, the ER setting that is shared with first user 202 (e.g., ER setting 218).

FIG. 2F illustrates another example method for two or more users (e.g., first user 202 and second user 204) to enter into an ER setting that is shared by the two or more users. In FIG. 2F, first electronic device 206 detects (e.g., using one or more mics of the device) that first user 202 is engaging in a conversation with second user 204 (e.g., an engaging conversation that has been ongoing for at least a predetermined amount of time, such as 10 seconds, 30 seconds, or 1 minute). In some embodiments, in response to detecting that first user 202 is engaging in the conversation with second user 204, if first electronic device 206 was displaying an ER setting that was not shared with second user 204 (e.g., ER setting 214), first electronic device 206 transitions to displaying an ER setting that is shared with second user 204 (e.g., ER setting 218), where the ER setting that is shared with second user 204 includes an avatar (e.g., avatar 222) corresponding to second user 204 within the shared ER setting.

On the other hand, in some embodiments, in response to detecting that first user 202 is engaging in the conversation with second user 204, if first electronic device 206 was not displaying an ER setting, first electronic device 206 displays, on display 210 of the device, the ER setting that is shared with second user 204 (e.g., ER setting 218).

Similarly, in FIG. 2F, second electronic device 206 detects (e.g., using one or more mics of the device) that second user 204 is engaging in the conversation with first user 202. In some embodiments, in response to detecting that second user 204 is engaging in the handshake with first user 202, if second electronic device 208 was displaying an ER setting that was not shared with first user 202 (e.g., ER setting 218), second electronic device 208 transitions to displaying an ER setting that is shared with first user 202 (e.g., ER setting 218), where the ER setting that is shared with first user 202 includes an avatar (e.g., avatar 220) corresponding to first user 202 within the shared ER setting.

On the other hand, in some embodiments, in response to detecting that second user 204 is engaging in the conversation with first user 202, if second electronic device 208 was not displaying an ER setting, second electronic device 208 displays, on display 212 of the device, the ER setting that is shared with first user 202 (e.g., ER setting 218).

As previously discussed, FIG. 2G illustrates ER setting 218 (e.g., a desert) that includes both avatar 220 corresponding to first user 202 and avatar 222 corresponding to second user 204, shown from the perspective of first user 202 in display 210 of first electronic device 206 and from the perspective of second user 204 in display 212 of second electronic device 208. ER setting 218 is an enhanced reality setting that was initialized (e.g., via one or more of the processes described above with reference to FIGS. 2C-2G) to include both first user 202 and second user 204. Thus, as shown in FIG. 2G, in contrast to ER setting 214 and ER setting 216 depicted in FIG. 2B, first user 202 can see, within ER setting 218, avatar 222 corresponding to second user 204 and, similarly, second user 204 can see, within ER setting 218, avatar 220 corresponding to first user 202.

Additionally, ER setting 218 is not limited to being shared by two users. In some embodiments, ER setting 218 can be shared by a plurality of users, including three or more users. For example, three or more users can initialize a shared ER setting, such as ER setting 218, by satisfying the proximity criterion described above with reference to FIG. 2C.

Furthermore, methods to initialize a shared ER setting is not limited to the triggering events (e.g., satisfying a proximity criterion, detecting a gaze, detecting a handshake, detecting an engaging conversation) described. For another example, the initialization of an ER setting (e.g., ER setting 218) shared by two or more users (e.g., first user 202 and second user 204) can be triggered by first electronic device 206 detecting (e.g., using an eye tracking sensor of the device) a wink made by first user 202 directed towards second user 204 and/or by second electronic device 208 detecting (e.g., using an eye tracking sensor of the device) a wink made by second user 204 directed towards first user 202. For another example, the initialization of an ER setting (e.g., ER setting 218) shared by two or more users (e.g., first user 202 and second user 204) can be triggered by first electronic device 206 detecting (e.g., using an orientation sensor and/or movement sensor of the device) a nod made by first user 202 directed towards second user 204 and/or by second electronic device 208 detecting (e.g., using an orientation sensor and/or movement sensor of the device) a nod made by second user 204 directed towards first user 202.

It is noted that users of electronic devices 206 and 208 can choose to opt-in or opt-out of the sharing of ER settings. For example, in some embodiments, device 206 may allow its user to choose whether the device is discoverable by other devices such as device 208. If device 206 is not discoverable, device 208 will not alert its user 208 to the presence of device 206 even if the two devices are in proximity. As another example, device 206 may allow user 202 to provide a list of trusted contacts with whom shared experiences in ER settings may be allowed. Conversely, device 206 may allow user 202 to specify limits, e.g., a blocked list, of users with whom ER settings are not to be allowed. As another example, device 206 may expressly confirm with user 202 as to whether to allow or disallow a particular ER session. In these ways, the present techniques preserve user privacy while improving a user's ability to easily invite others to share an ER setting as appropriate.

Figure 3:
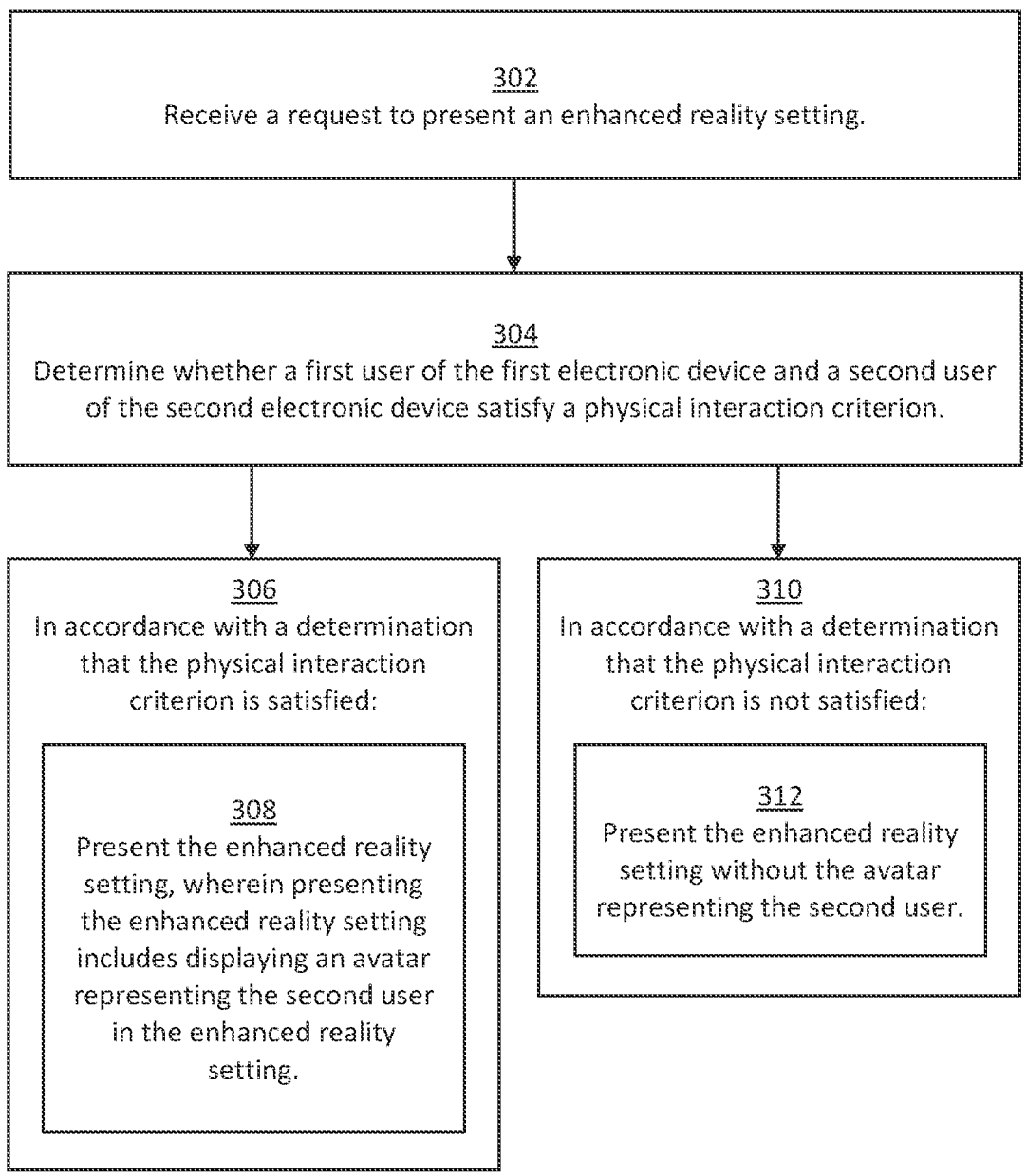
FIG. 3 is a flow diagram for initializing members of a shared enhanced reality setting, in accordance with some embodiments.

FIG. 3 is a flow diagram for initializing members of a shared ER setting, in accordance with some embodiments. In some embodiments, the flow of FIG. 3 is performed using an electronic device (e.g., electronic device 100a, electronic device 206, electronic device 208; a mobile electronic device such as a smartphone or a tablet computer; a HMD) that is in communication with another electronic device (e.g., electronic device 100a, electronic device 206, electronic device 208; a mobile electronic device such as a smartphone or a tablet computer; a HMD) and/or an external server.

In some embodiments, flow 300 of FIG. 3 is performed at a first electronic device (e.g., 206) having one or more sensors and one or more displays adapted to present an ER setting (e.g., 212, 214, 218; a VR setting; a MR setting, including an AR setting) and communicate with a second electronic device (e.g., 208) adapted to present the ER setting.

The first electronic device (e.g., 206) receives, at block 302, a request to present the ER setting (e.g., 218).

The first electronic device (e.g., 206) determines, at block 304, whether a first user (e.g., 202) of the first electronic device (e.g., 206) and a second user (e.g., 204) of the second electronic device (e.g., 208) satisfy a physical interaction criterion (e.g., a criterion based on user actions in a physical setting (e.g., 200), such as proximity between the first user and the second user or a social action (e.g., a handshake, gaze) between the first user and the second user).

In accordance with a determination, at block 306, that the physical interaction criterion is satisfied, the first electronic device (e.g., 206) presents, at block 308, the ER setting (e.g., 218), wherein presenting the ER setting includes displaying an avatar (e.g., 222) representing the second user (e.g., 204) in the ER setting.

In accordance with a determination, at block 310, that the physical interaction criterion is not satisfied, the first electronic device (e.g., 206) presents, at block 312, the ER setting (e.g., 214) without the avatar (e.g., 222) representing the second user (e.g., 204).

In some embodiments, presenting the ER setting (e.g., 218) comprises: displaying, at the first electronic device (e.g., 206), a confirmation affordance requesting confirmation for entering the ER setting with the second user (e.g., 204); and in response to detecting confirmation by the first user (e.g., 202), presenting the ER setting that includes the avatar (e.g., 222) representing the second user.

In some embodiments, the physical interaction criterion being satisfied includes the first user (e.g., 202) and the second user (e.g., 204) being within a predetermined distance of one another within a physical setting (e.g., 200).

In some embodiments, the physical interaction criterion being satisfied includes a social signal between the first user (e.g., 202) and the second user (e.g., 204) being detected within the physical setting (e.g., 200).

In some embodiments, the social signal is a handshake performed between the first user (e.g., 202) and the second user (e.g., 204) within the physical setting (e.g., 200).

In some embodiments, the social signal is a conversation performed between the first user (e.g., 202) and the second user (e.g., 204) within the physical setting (e.g., 200). In some embodiments, the conversation is an engaging conversation such that the first user and the second user have been engaging in a continuous conversation for at least a predetermined amount of time.

In some embodiments, the social signal is a gaze (e.g., that is maintained for at least a predetermined amount of time) by the first user (e.g., 202) directed to the second user (e.g., 204) within the physical setting (e.g., 200). In some embodiments, the social signal is a nod by the first user directed to the second user within the physical setting. In some embodiments, the social signal is a wink by the first user directed to the second user within the physical setting.

In some embodiments, the first electronic device (e.g., 206) includes one or more sensors (e.g., one or more cameras, one or more movement sensors) for detecting a movement corresponding to a signal action (e.g., movement to perform a handshake, gazing at the second user, winking at the second user, nodding at the second user) made by the first user (e.g., 202) within the physical setting (e.g., 200).

FIGS. 4A-4I depict an exemplary process for forming a private sub-space within an ER setting that includes a subset of the avatars within the ER setting (e.g., a sub-enhanced reality (sub-ER) setting within the ER setting) and example features of the private sub-space.

Figure 4A:
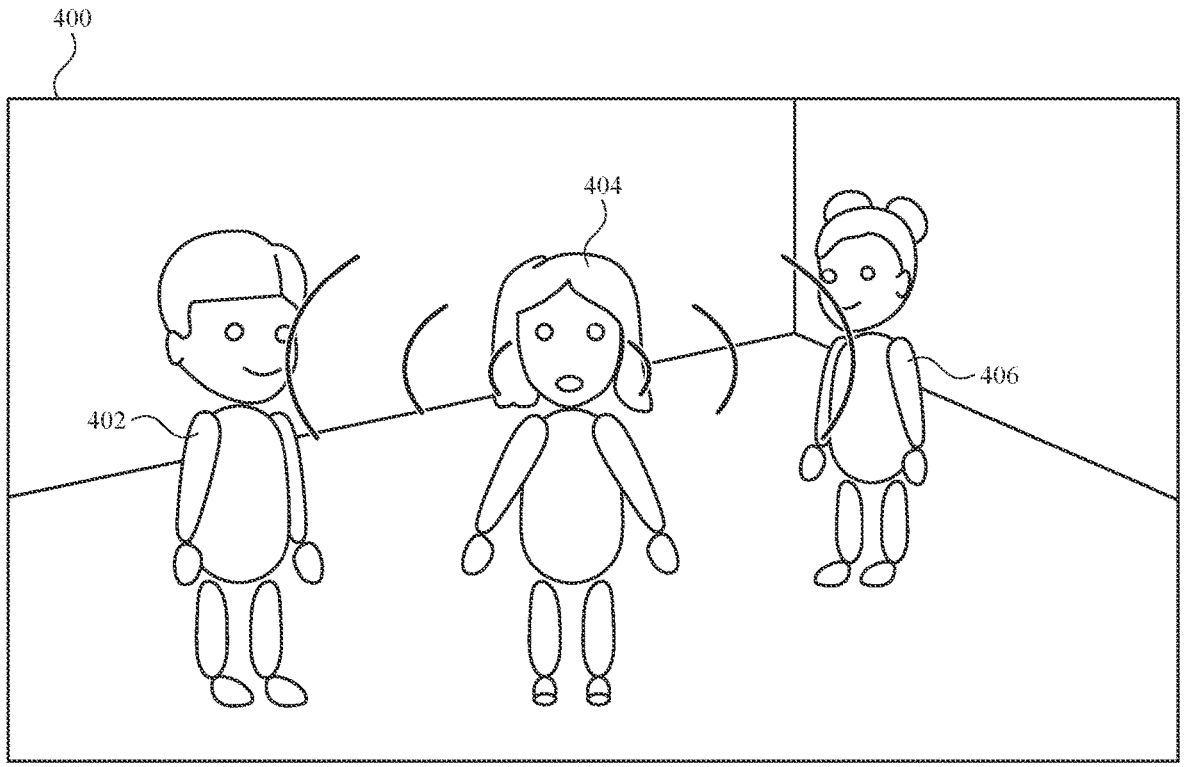
FIGS. 4A-4I depict an exemplary process for forming a private sub-space and example features of the private sub-space, in accordance with some embodiments.

FIG. 4A illustrates an ER setting 400 (e.g., a virtual room initialized using one or more methods described above with reference to FIGS. 2A-2G), where ER setting 400 includes a plurality of avatars, including a first avatar 402 corresponding to a first user of a first electronic device (e.g., similar to first electronic device 206 and second electronic device 208), a second avatar 404 corresponding to a second user of a second electronic device (e.g., similar to first electronic device 206 and second electronic device 208), and a third avatar 406 corresponding to a third user of a third electronic device (e.g., similar to first electronic device 206 and second electronic device 208). That is, first avatar 402 is a virtual representation of, and is controlled by, the first user, second avatar 404 is a virtual representation of, and is controlled by, the second user, and third avatar 406 is a virtual representation of, and is controlled by, the third user.

In FIG. 4A, first avatar 402, second avatar 404, and third avatar 406 are included within ER setting 400 such that interactions supported by ER setting 400 are made available to avatars 402, 402, and 406. For example, in FIG. 4A, audio corresponding to an audio input (e.g., a spoken input, a voice input) made by the second user (e.g., captured via a mic of the second electronic device of the second user) via second avatar 404 is played at the devices of both the first user of first avatar 402 and the third user of third avatar 406. Further, in FIG. 4A, movements made by second avatar 404 within ER setting 400 is displayed to the first user of first avatar 402 via a display of the first device, and displayed to the third user of third avatar 406 via a display of the third device.

Figure 4B:
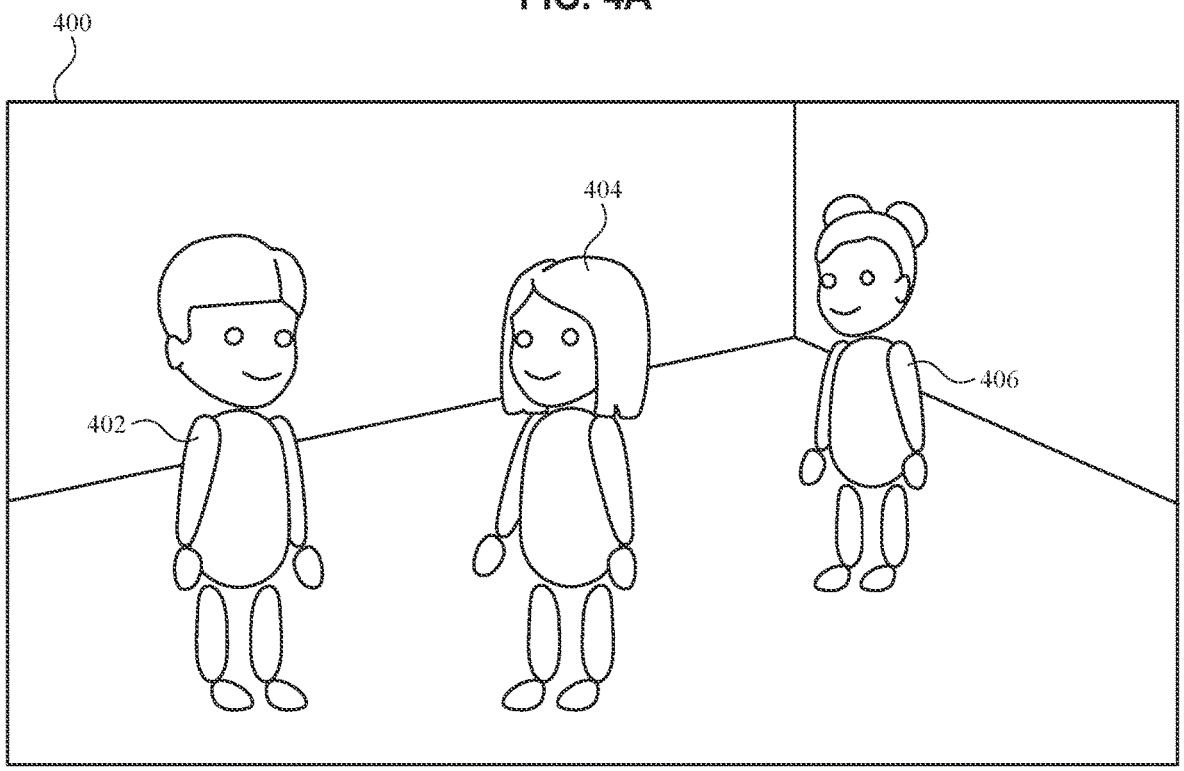

In FIG. 4B, while the three avatars are included in ER setting 400, a determination is made (e.g., by an external server in communication with the first device of the first user, the second device of the second user, and the third device of the third user and/or by one or more of the first device, second device, and third device) that second avatar 404 is gazing at (e.g., looking at for at least predetermined time period, such as at least 10 seconds, 5 seconds, or 3 seconds) first avatar 402. In some embodiments, the gaze triggers the formation of a private sub-space within the ER setting (e.g., a sub-ER setting within the ER setting that a subset of, but not all of, the avatars present within the ER setting is included in).

Figure 4C:
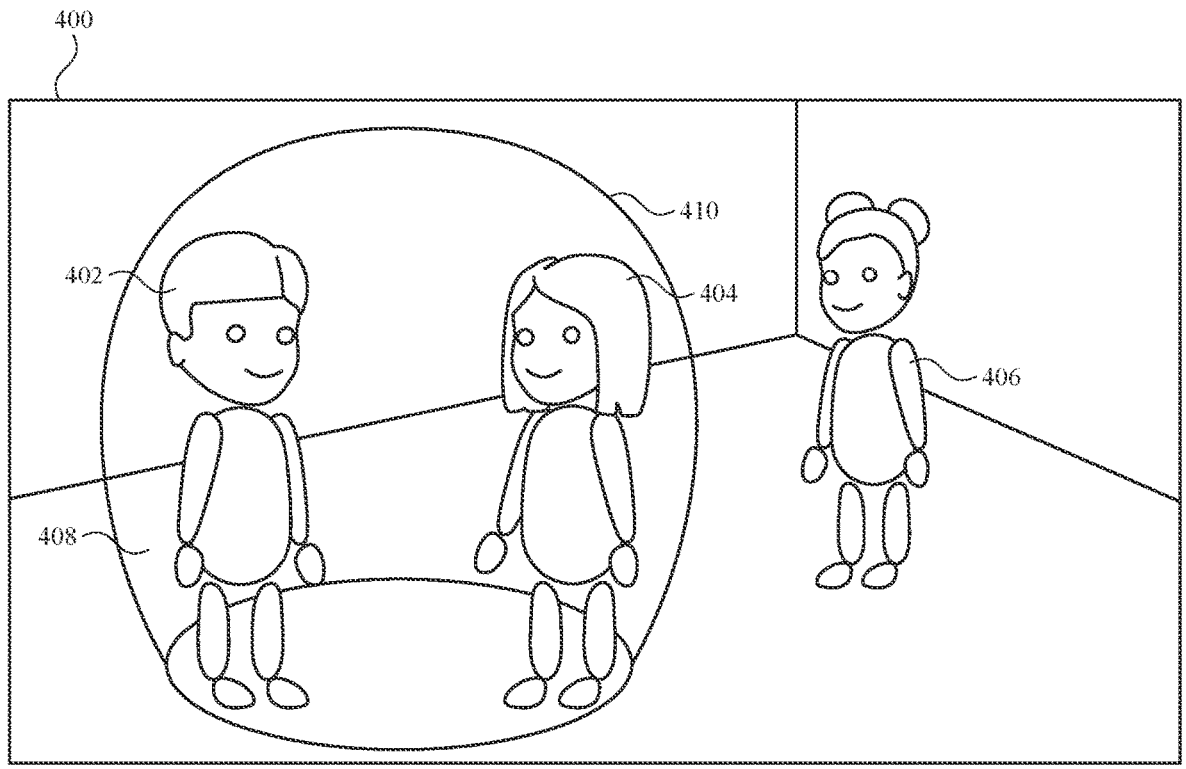

In FIG. 4C, in response to the determination that second avatar 404 is gazing at first avatar 402, a private sub-space 408 that includes first avatar 402 and second avatar 404 but does not include third avatar 406 is formed within ER setting 400. In some embodiments, as shown in FIG. 4C, a visual indication 410 of the formed private sub-space (e.g., a halo or a partially transparent cone that encompasses the avatars within the private sub-space) is further provided to indicate to the users of other avatars within ER setting 400 (e.g., the user of third avatar 406) that first avatar 402 and second avatar 404 are engaging in a private conversation in a sub-space within the ER setting (e.g., an ER-equivalent of texting under the table).

Figure 4D:
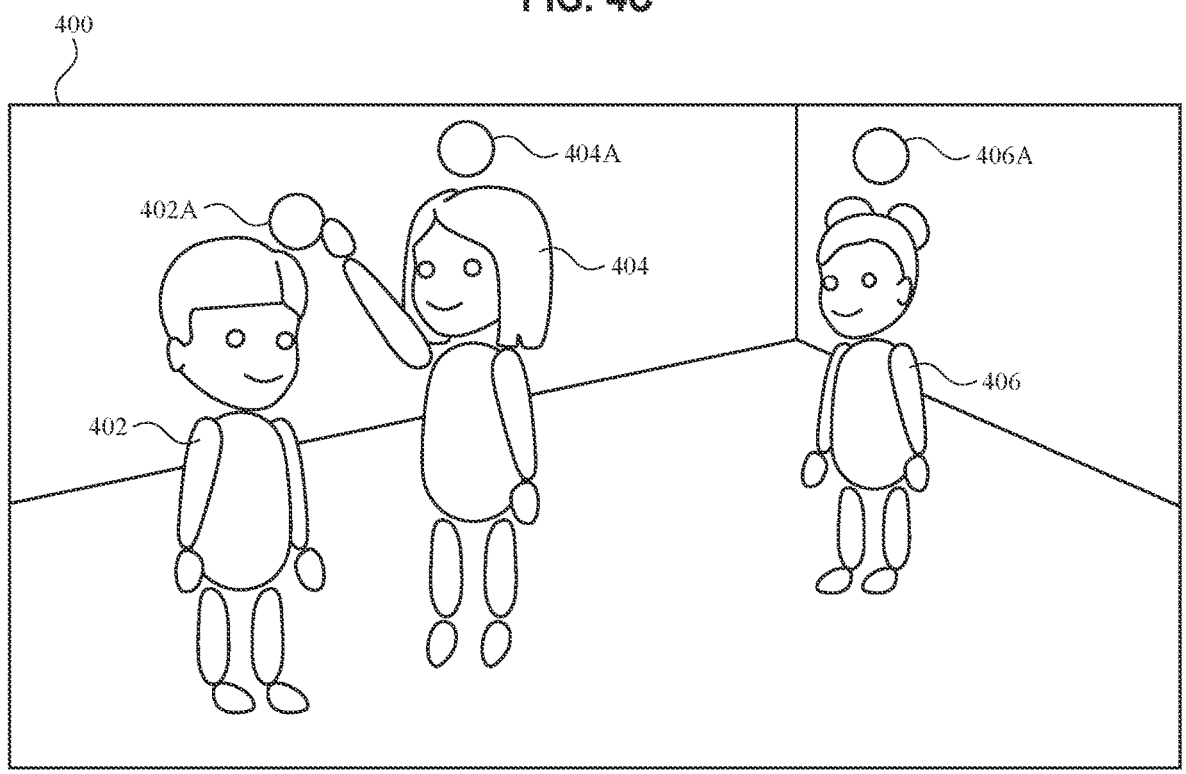

FIG. 4D illustrates another example method for first avatar 402 and second avatar 404 to enter into a private sub-space, such as private sub-space 408, within ER setting 400. In some embodiments, each avatar of the plurality of avatars in ER setting 400 (e.g., first avatar 402, second avatar 404, and third avatar 406) have a corresponding selectable affordance (e.g., displayed above or adjacent to the respective avatar), as shown in FIG. 4D. For example, first avatar 402 has a selectable affordance 402A, second avatar 404 has a selectable affordance 404A, and third avatar 406 has a selectable affordance 406A. In FIG. 4D, second avatar 404 selects/activates selectable affordance 402A of first avatar 402. In some embodiments, second avatar 404's selection/activation of selectable affordance 402A of first avatar 402 triggers the formation of private sub-space 408 that includes first avatar 402 and second avatar 404 but does not include third avatar 406, as previously shown in FIG. 4C.

Methods for the creation of a private sub-space (e.g., private sub-space 408) is not limited to the two examples illustrated in FIGS. 4B and 4D. Another example method for first avatar 402 and second avatar 404 to form a private sub-space includes first avatar 402 and second avatar 404 engaging in a particular type of social interaction (e.g., a nod, a wink, physical contact). For example, the formation of a private sub-space between first avatar 402 and second avatar 404 can be triggered by a nod made by second avatar 404 directed to first avatar 402. For another example, the formation of a private sub-space between first avatar 402 and second avatar 404 and be triggered by a wink made by second avatar 404 directed to first avatar 402. For another example, the formation of a private sub-space between first avatar 402 and second avatar 404 can be triggered by a physical contact (e.g., second avatar 404 putting a hand on the shoulder of first avatar 402) between the two avatars.

Furthermore, another example method for first avatar 402 and second avatar 404 to form a private sub-space (e.g., private sub-space 408) includes first avatar 402 and second avatar 404 satisfying a proximity criterion. For example, the formation of a private sub-space can be triggered by first avatar 402 and second avatar 404 moving to be within a predetermined distance of one another within ER setting 400 (e.g., and also maintaining the proximity for at least a predetermined time period).

Additionally, a private sub-space (e.g., private sub-space 408) within an ER setting is not limited to being shared by two avatars. In some embodiments, a private sub-space can be shared by a plurality of avatars, including three or more avatars. For example, three avatars (e.g., first avatar 402, second avatar 404, and third avatar 406) can form a private sub-space, such as private sub-space 408, by moving to be within a predetermined distance of one another within the ER setting, thereby satisfying a proximity criterion to trigger the formation of a sub-space encompassing the three avatars.

Figure 4E:
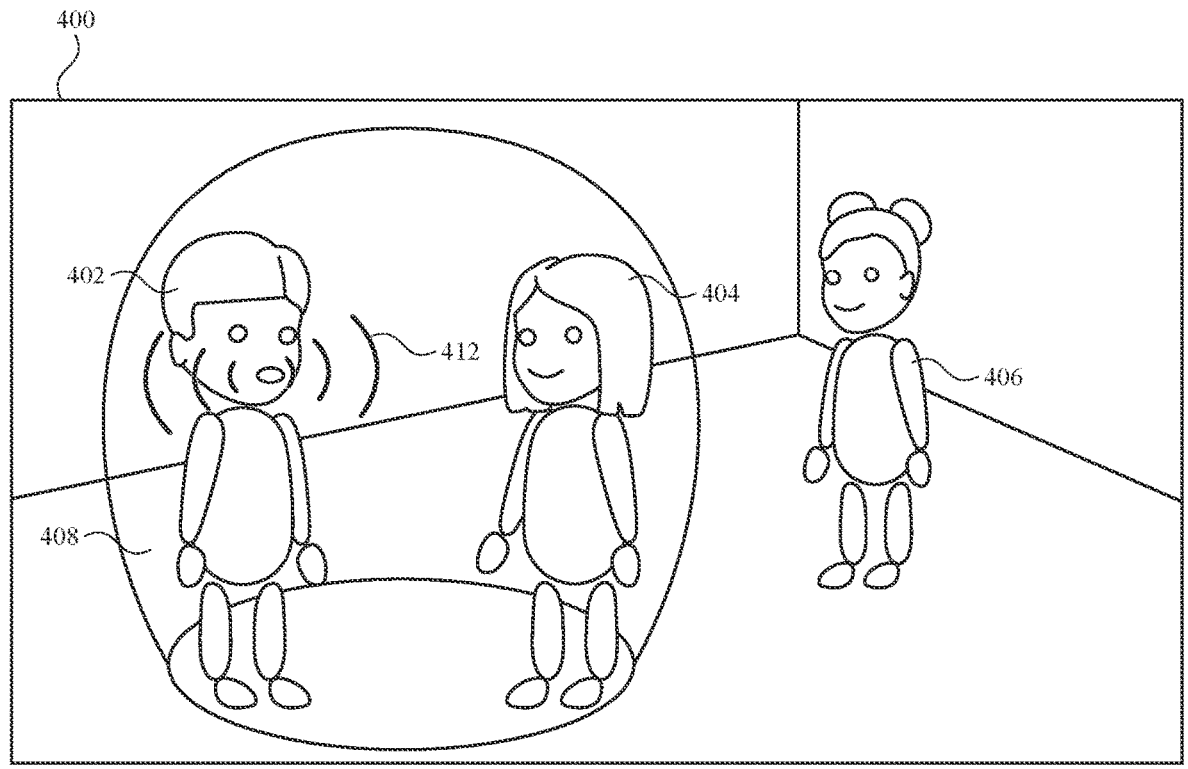

FIG. 4E illustrates ER setting 400 that includes private sub-space 408 including first avatar 402 and second avatar 404 but not including third avatar 406, as previously depicted in FIG. 4C. In FIG. 4E, audio 412 corresponding to an audio input (e.g., a spoken input, a voice input) made by the first user (e.g., captured via a mic of the first device of the first user) via first avatar 402 is played at the second device of the second user of second avatar 404, as first avatar 402 and second avatar 404 are included in private sub-space 408. However, audio 412 is not played (e.g., it is prevented/blocked from being played) at the third device of the third user of third avatar 406 (and at the device of any other user of any other avatar within ER setting 400), as third avatar 406 is not included in private sub-space 408.

In some embodiments, as shown in FIG. 4E, while audio 412 corresponding to the audio input made by the first user via first avatar 412 is being played at the second device of the second user of second avatar 404 and not being played at the third device of the third user of third avatar 406, movements of first avatar 402 corresponding to audio 412 (e.g., moving lips and/or other physical gestures such as hand gestures) can still be seen by third avatar 406 (and any other avatar in ER setting 400) from outside private sub-space 408. Thus, in some embodiments, a user of an avatar that is outside of the private sub-space (e.g., the third user of third avatar 406) cannot hear audio corresponding to audio 412 but can still see movements (e.g., moving lips, hand gestures) corresponding to audio 412 via the device of the user.

Figure 4F:
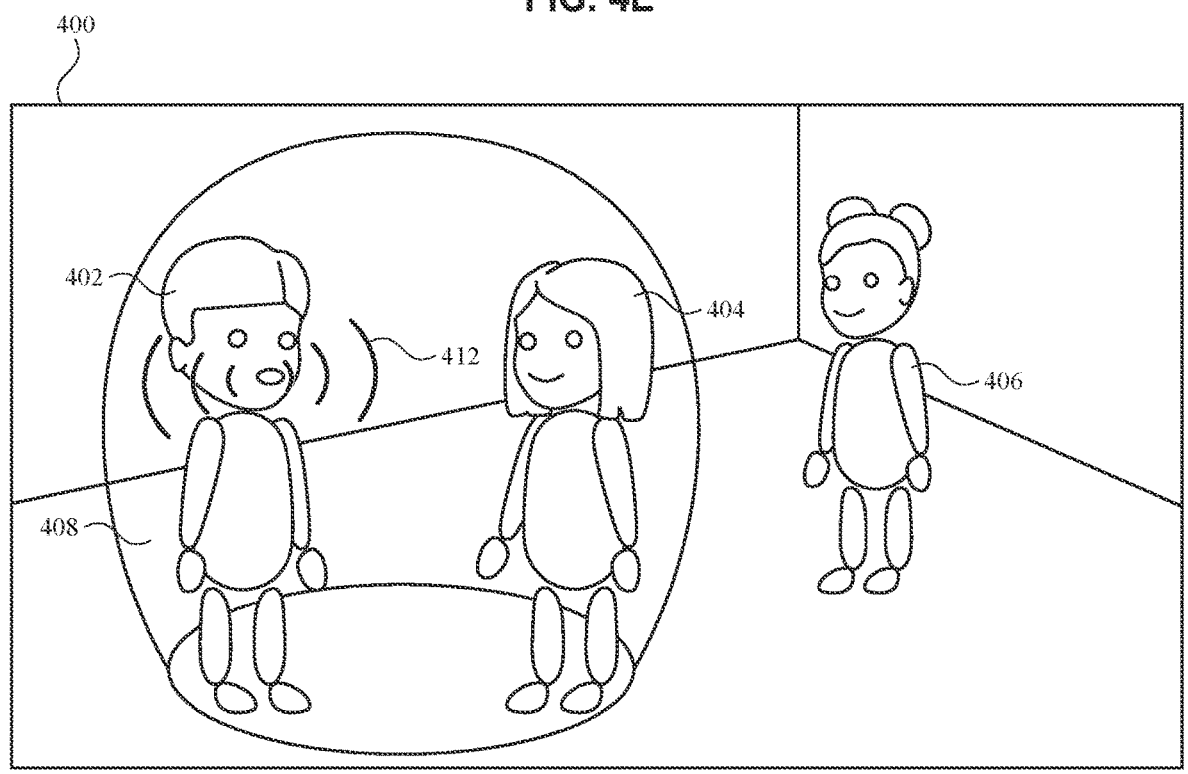

In some embodiments, as shown in FIG. 4F, while audio 412 corresponding to the audio input made by the first user via first avatar 402 is being played at the second device of the second user of second avatar 404 and not being played at the third device of the third user of third avatar 406, movements of first avatar 402 corresponding to audio 412 cannot be seen by third avatar 406 (and by any other avatar in ER setting 400) from outside of private sub-space 408. Thus, in some embodiments, a user of an avatar that is outside of the private sub-space (e.g., the third user of third avatar 406) cannot hear audio corresponding to audio 412 nor see movements corresponding to audio 412. Further, in some embodiments, a user of an avatar that is outside of the private sub-space (e.g., third avatar 406) cannot see any movements of avatars within the private sub-space (e.g., first avatar 402 and second avatar 404) via the device of the user.

Figure 4G:
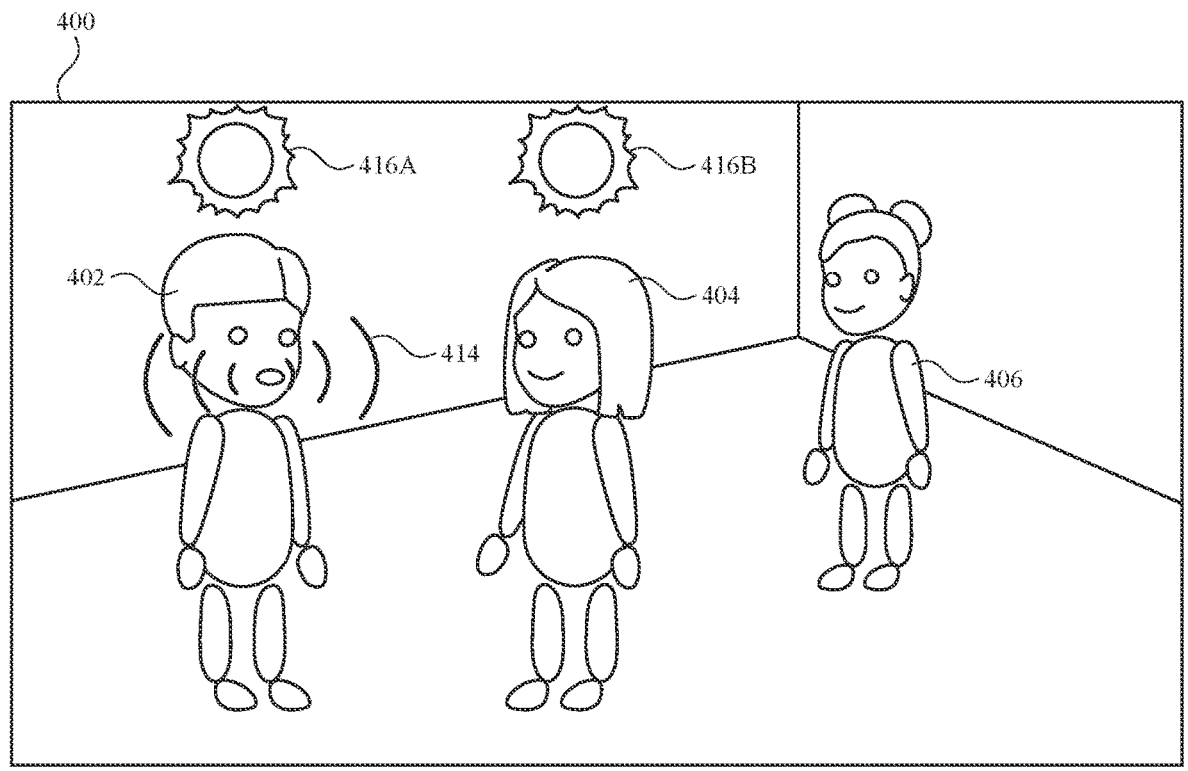

FIG. 4G illustrates ER setting 400 with first avatar 402 and second avatar 404 in a private sub-space 414 and third avatar 406 not included in private sub-space 414. In some embodiments, as shown in FIG. 4G, private sub-space 414 does not include visual indication 410 of private sub-space 408 that indicates to outside avatars (e.g., third avatar 406) that first avatar 402 and second avatar 404 is in a private sub-space. Instead, in some embodiments, private sub-space 414 includes a visual indication 416A above or adjacent to first avatar 402 (e.g., a glowing/shining light source) and a similar visual indication 416B above or adjacent to second avatar 404, thereby indicating to outside avatars (e.g., third avatar 406) that first avatar 402 and second avatar 404 are in a private sub-space.

Figure 4H:
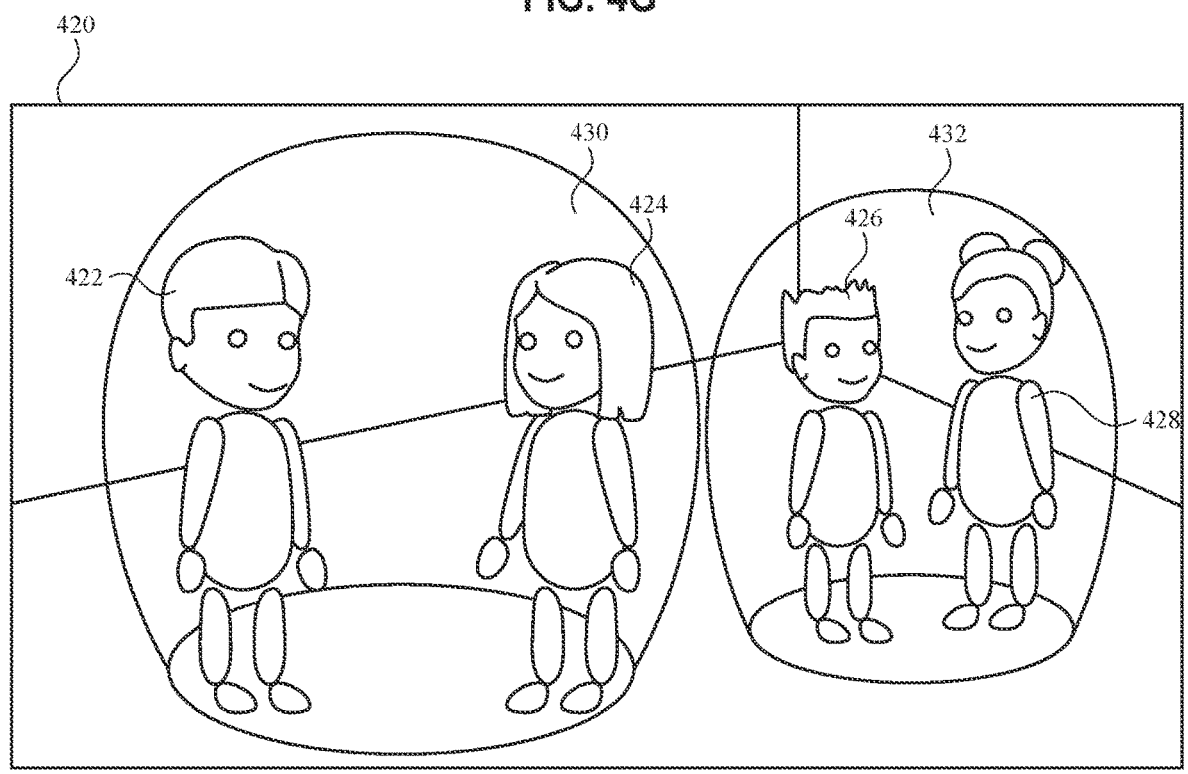

FIG. 4H illustrates an ER setting 420 that includes a first avatar 422 (corresponding to a first user of a first electronic device), a second avatar 424 (corresponding to a second user of a second electronic device), a third avatar 426 (corresponding to a third user of a third electronic device), and a fourth avatar 428 (corresponding to a fourth user of a fourth electronic device). As shown in FIG. 4H, first avatar 422 and second avatar 424 is in a first private sub-space 430 within ER setting 420 and third avatar 426 and fourth avatar 428 is in a second private sub-space 432.

Figure 4I:
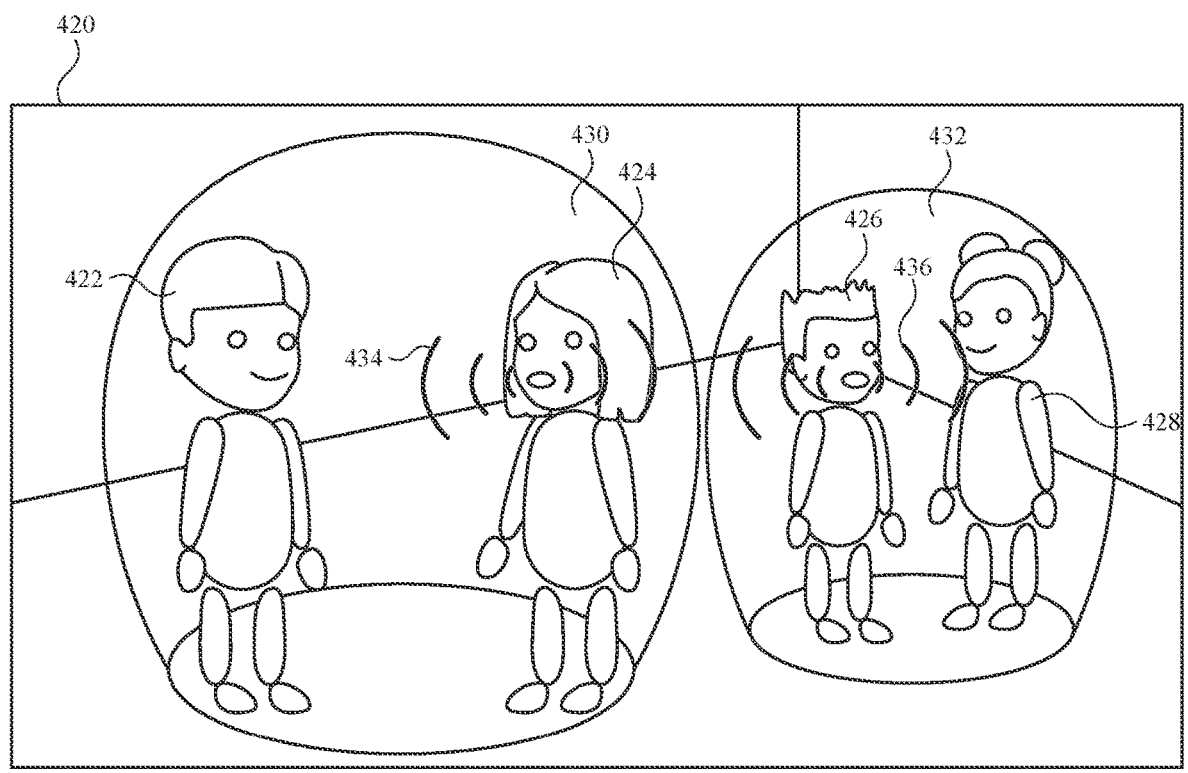

In FIG. 4I, audio 434 corresponding to an audio input (e.g., a spoken input, a voice input) made by the second user (e.g., captured via a mic of the second device of the second user) via second avatar 424 is played at the first device of the first user of first avatar 422, as first avatar 422 and second avatar 424 are included in the same private sub-space 430. However, audio 434 is not played (e.g., it is prevented/blocked from being played) at the third device of the third user of third avatar 426 and at the fourth device of the fourth user of fourth avatar 428, as both third avatar 426 and fourth avatar 428 are not included in first private sub-space 430 (and are instead included in a different private sub-space 432).

Further in FIG. 4I, audio 436 corresponding to an audio input (e.g., a spoken input, a voice input) made by the third user (e.g., captured via a mic of the third device of the third user) via third avatar 426 is played at the fourth device of the fourth user of fourth avatar 428, as third avatar 426 and fourth avatar 428 are included in the same private sub-space 432. However, audio 436 is not played (e.g., it is prevented/blocked from being played) at the first device of the first user of first avatar 422 and at the second device of the second user of second avatar 424, as both first avatar 422 and second avatar 424 are not included in second private sub-space 432 (and are instead included in a different private sub-space 430).

Figure 5:
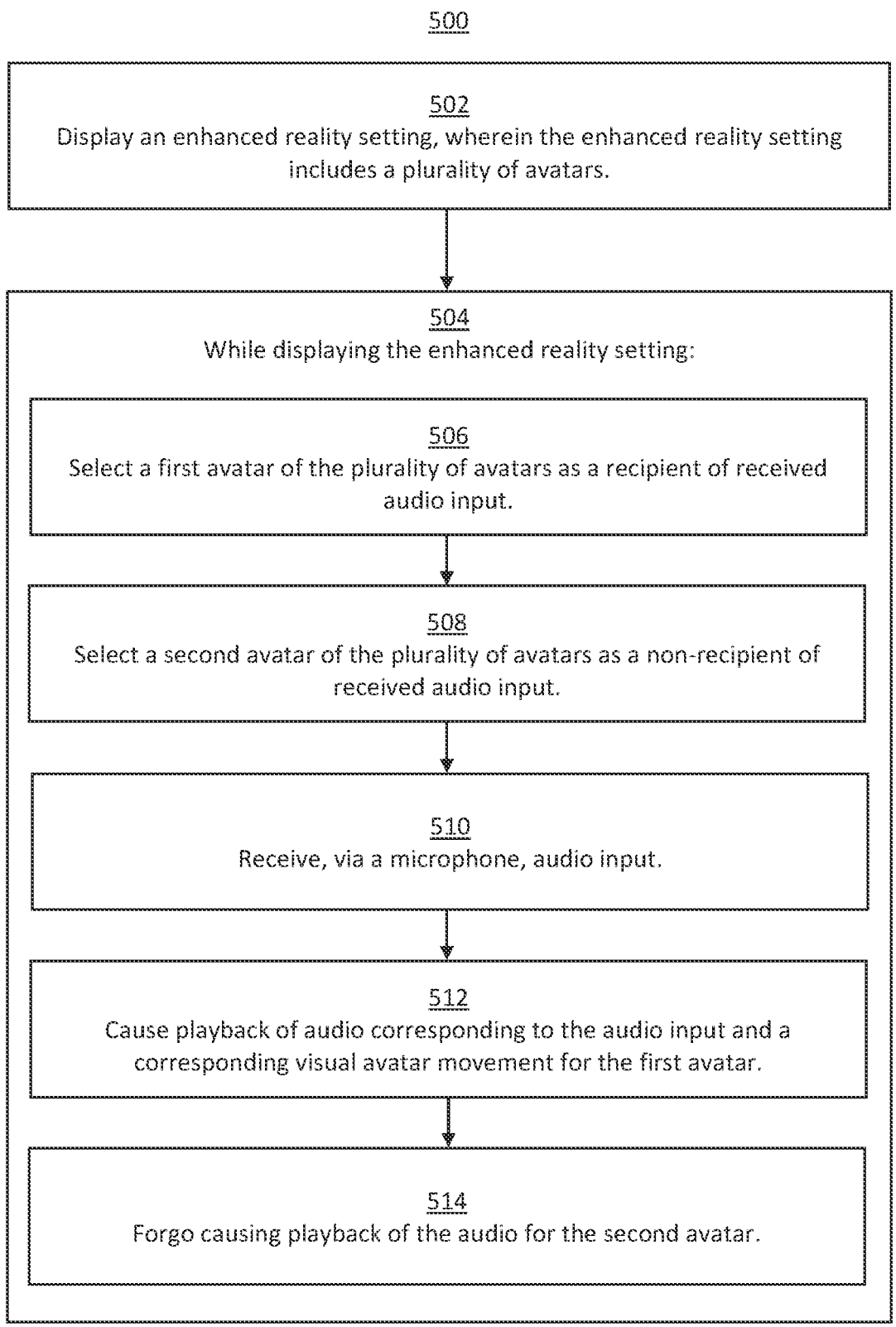
FIG. 5 is a flow diagram for forming and maintaining a private sub-space within an enhanced reality setting, in accordance with some embodiments.

FIG. 5 is a flow diagram for forming and maintaining a private sub-space within an ER setting, in accordance with some embodiments. In some embodiments, flow 500 of FIG. 5 is performed by a system that includes one or more electronic devices (e.g., electronic device 100a, electronic device 206, electronic device 208; a mobile electronic device such as a smartphone or a tablet computer; a HMD) and/or an external server, where the one or more electronic devices are in communication with each other and/or with the external server.

At block 502, the system (e.g., 100a, 206, 208) displays (e.g., at an electronic device, such as electronic device 100a, 206, 208, of the system) an ER setting (e.g., 400, a VR setting, a MR setting, including an AR setting), wherein the ER setting includes a plurality of avatars (e.g., of other users that share the same ER setting with the current user).

At block 504, while displaying the ER setting (e.g., 400), the system selects, at block 506, a first avatar (e.g., 404) of the plurality of avatars (e.g., 402, 404, 406) as a recipient of received audio input (e.g., 412, an audio input made by a user corresponding to a third avatar of the plurality of avatars).

At block 504, while displaying the ER setting (e.g. 400), the system also selects, at block 508, a second avatar (e.g., 406) of the plurality of avatars (e.g., 402, 404, 406) as a non-recipient of the received audio input.

At block 504, while displaying the ER setting (e.g., 400), the system also receives, at block 510, via a microphone (e.g., of the electronic device of the current user), audio input (e.g., 412).

At block 504, while displaying the ER setting (e.g., 400), the system also causes, at block 512, playback and a corresponding visual avatar movement for the first avatar (e.g., 404).

At block 504, while displaying ER setting (e.g., 400), the system also forgoes causing, at block 514, playback of the audio (e.g., 412) for the second avatar (e.g., 406).

In some embodiments, causing playback and the corresponding visual avatar movement for the first avatar (e.g., 404) comprises causing playback and the corresponding visual avatar movement for the first avatar in accordance with a determination that the first avatar is within (e.g., sharing with a current avatar) a sub-ER setting (e.g., 408) that includes the first avatar and does not include the second avatar (e.g., 406).

In some embodiments, the determination that the first avatar (e.g., 404) is within the sub-ER setting (e.g., 408) that includes the first avatar and does not include the second avatar is based on whether the first avatar satisfied a sub-ER setting criterion (e.g., with a third avatar of the plurality of avatars). In some embodiments, satisfying the sub-ER setting criterion with a third avatar of the plurality of avatars enables the first avatar to enter and/or be associated with the sub-ER setting with the third avatar.

In some embodiments, the sub-ER setting criterion being satisfied includes the first avatar being within a predetermined distance from a third avatar (e.g., 402) of the plurality of avatars within the ER setting (e.g., 400).

In some embodiments, the sub-ER setting criterion being satisfied includes a gaze by the first avatar (e.g., 404) directed to a third avatar (e.g., 402) of the plurality of avatars being detected within the ER setting (e.g., 400).

In some embodiments, the sub-ER setting criterion being satisfied includes a nod by the first avatar (e.g., 404) directed to a third avatar (e.g., 402) of the plurality of avatars being detected within the ER setting (e.g., 400).

In some embodiments, the sub-ER setting criterion being satisfied includes a wink by the first avatar (e.g., 404) directed to a third avatar (e.g., 402) of the plurality of avatars being detected within the ER setting (e.g., 400).

In some embodiments, the determination that the first avatar (e.g., 404) is within the sub-ER setting (e.g., 408) that includes the first avatar (e.g., 404) and does not include the second avatar (e.g., 406) is based on whether an affordance (e.g., 404A) associated with the first avatar has been selected (e.g., by a third avatar of the plurality of avatars). In some embodiments, additionally or alternatively, the determination that the first avatar is within the sub-ER setting that includes the first avatar and does not include the second avatar is based on whether an affordance associated with a third avatar of the plurality of avatars has been selected by the first avatar.

In some embodiments, while displaying the ER setting (e.g., 400), the system presents (e.g., to a fourth avatar of the plurality of avatars) a visual indication (e.g., 416B, a light shown above or proximate to the first avatar) for the first avatar indicating that the first avatar is a recipient of the received user input. In some embodiments, while displaying the ER setting, the system forgoes presenting (e.g., to the fourth avatar of the plurality of avatars) the visual indication for the second avatar (e.g., because the second avatar is a non-recipient of the received user input).

In some embodiments, the visual indication (e.g., 416B) for the first avatar is a light source shown proximate to (e.g., above the head of) the first avatar (e.g., 404) within the ER setting (e.g., 400).

Various processes defined herein consider the option of obtaining and utilizing a user's personal information. For example, such personal information may be utilized in order to provide an improved experience for members of a shared enhanced reality setting on one or more electronic devices. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

What is claimed is:

1. A method, comprising:
    displaying an enhanced reality setting, wherein the enhanced reality setting includes a plurality of avatars; and
    while displaying the enhanced reality setting:
        in accordance with a determination that a first avatar of the plurality of avatars satisfies a set of sub-enhanced reality criteria, wherein a first sub-enhanced reality criterion from the set of sub-enhanced reality criteria is satisfied when a respective avatar is within a predetermined distance of a third avatar of the plurality of avatars:
selecting the first avatar as a recipient of received audio input;
in accordance with a determination that a second avatar of the plurality of avatars does not satisfy the set of sub-enhanced reality criteria:
selecting the second avatar as a non-recipient of the received audio input;
receiving, via a microphone, audio input, wherein the audio input is intended for a user corresponding to the first avatar within the enhanced reality setting;
causing playback of audio corresponding to the audio input and a corresponding visual avatar movement for the first avatar;
displaying a visual indication to indicate that the first avatar and the third avatar are in a private communication session in the enhanced reality setting; and
forgoing causing playback of the audio for the second avatar in the enhanced reality setting.

2. The method of claim 1, wherein causing playback and the corresponding visual avatar movement for the first avatar comprises causing playback and the corresponding visual avatar movement for the first avatar in accordance with a determination that the first avatar is within a subenhanced reality setting that includes the first avatar and does not include the second avatar.

3. The method of claim 1, wherein a second sub-enhanced reality criterion from the set of sub-enhanced reality criteria is satisfied when a gaze by the first avatar directed to the third avatar of the plurality of avatars is detected within the enhanced reality setting.

4. The method of claim 1, wherein a third sub-enhanced reality criterion from the set of sub-enhanced reality criteria is satisfied when a nod by the first avatar directed to the third avatar of the plurality of avatars is detected within the enhanced reality setting.

5. The method of claim 1, wherein a fourth sub-enhanced reality criterion from the set of sub-enhanced reality criteria is satisfied when a wink by the first avatar directed to the third avatar of the plurality of avatars is detected within the enhanced reality setting.

6. The method of claim 2, wherein the determination that the first avatar is within the sub-enhanced reality setting that includes the first avatar and does not include the second avatar is based on whether an affordance associated with the first avatar has been selected.

7. The method of claim 1, wherein the visual indication for the first avatar is a light source shown proximate to the first avatar within the enhanced reality setting.

8. A non-transitory computer-readable storage medium storing one or more programs configured to be executed by one or more processors of one or more electronic devices, the one or more programs including instructions for:
displaying an enhanced reality setting, wherein the enhanced reality setting includes a plurality of avatars; and
while displaying the enhanced reality setting:
in accordance with a determination that a first avatar of the plurality of avatars satisfies a set of sub-enhanced reality criteria, wherein a first sub-enhanced reality criterion from the set of sub-enhanced reality criteria is satisfied when a respective avatar is within a predetermined distance of a third avatar of the plurality of avatars:
selecting the first avatar as a recipient of received audio input;
in accordance with a determination that a second avatar of the plurality of avatars does not satisfy the set of sub-enhanced reality criteria:
selecting the second avatar as a non-recipient of the received audio input;
receiving, via a microphone, audio input, wherein the audio input is intended for a user corresponding to the first avatar within the enhanced reality setting;
causing playback of audio corresponding to the audio input and a corresponding visual avatar movement for the first avatar;
displaying a visual indication to indicate that the first avatar and the third avatar are in a private communication session in the enhanced reality setting; and
forgoing causing playback of the audio for the second avatar in the enhanced reality setting.

9. The non-transitory computer-readable storage medium of claim 8, wherein causing playback and the corresponding visual avatar movement for the first avatar comprises causing playback and the corresponding visual avatar movement for the first avatar in accordance with a determination that the first avatar is within a sub-enhanced reality setting that includes the first avatar and does not include the second avatar.

10. The non-transitory computer-readable storage medium of claim 8, wherein a second sub-enhanced reality criterion from the set of sub-enhanced reality criteria is satisfied when a gaze by the first avatar directed to the third avatar of the plurality of avatars is detected within the enhanced reality setting.

11. The non-transitory computer-readable storage medium of claim 8, wherein a third sub-enhanced reality criterion from the set of sub-enhanced reality criteria is satisfied when a nod by the first avatar directed to the third avatar of the plurality of avatars is detected within the enhanced reality setting.

12. The non-transitory computer-readable storage medium of claim 8, wherein a fourth sub-enhanced reality criterion from the set of sub-enhanced reality criteria is satisfied when a wink by the first avatar directed to the third avatar of the plurality of avatars is detected within the enhanced reality setting.

13. The non-transitory computer-readable storage medium of claim 9, wherein the determination that the first avatar is within the sub-enhanced reality setting that includes the first avatar and does not include the second avatar is based on whether an affordance associated with the first avatar has been selected.

14. The non-transitory computer-readable storage medium of claim 8, wherein the visual indication for the first avatar is a light source shown proximate to the first avatar within the enhanced reality setting.

15. A system, comprising:
one or more processors of one or more electronic devices; and
memory storing one or more programs configured to be executed by the one or more processors, the one or more programs including instructions for:
displaying an enhanced reality setting, wherein the enhanced reality setting includes a plurality of avatars; and
while displaying the enhanced reality setting:
in accordance with a determination that a first avatar of the plurality of avatars satisfies a set of sub-enhanced reality criteria, wherein a first sub-enhanced reality criterion from the set of sub-enhanced reality criteria is satisfied when a respective avatar is within a predetermined distance of a third avatar of the plurality of avatars:
  selecting the first avatar as a recipient of received audio input;
in accordance with a determination that a second avatar of the plurality of avatars does not satisfy the set of sub-enhanced reality criteria:
  selecting the second avatar as a non-recipient of the received audio input;
receiving, via a microphone, audio input, wherein the audio input is intended for a user corresponding to the first avatar within the enhanced reality setting;
causing playback of audio corresponding to the audio input and a corresponding visual avatar movement for the first avatar;
displaying a visual indication to indicate that the first avatar and the third avatar are in a private communication session in the enhanced reality setting; and
forgoing causing playback of the audio for the second avatar in the enhanced reality setting.

16. The system of claim 15, wherein causing playback and the corresponding visual avatar movement for the first avatar comprises causing playback and the corresponding visual avatar movement for the first avatar in accordance with a determination that the first avatar is within a sub-enhanced reality setting that includes the first avatar and does not include the second avatar.

17. The system of claim 15, wherein a second sub-enhanced reality criterion from the set of sub-enhanced reality criteria is satisfied when a gaze by the first avatar directed to the third avatar of the plurality of avatars is detected within the enhanced reality setting.

18. The system of claim 15, wherein a third sub-enhanced reality criterion from the set of sub-enhanced reality criteria is satisfied when a nod by the first avatar directed to the third avatar of the plurality of avatars is detected within the enhanced reality setting.

19. The system of claim 15, wherein a fourth sub-enhanced reality criterion from the set of sub-enhanced reality criteria is satisfied when a wink by the first avatar directed to the third avatar of the plurality of avatars is detected within the enhanced reality setting.

20. The system of claim 16, wherein the determination that the first avatar is within the sub-enhanced reality setting that includes the first avatar and does not include the second avatar is based on whether an affordance associated with the first avatar has been selected.

21. The system of claim 15, wherein the visual indication for the first avatar is a light source shown proximate to the first avatar within the enhanced reality setting.

* * * * *

UNITED STATES PATENT AND TRADEMARK OFFICE
CERTIFICATE OF CORRECTION

PATENT NO. : 11,908,086 B2
APPLICATION NO. : 17/900657
DATED : February 20, 2024
INVENTOR(S) : Fletcher R. Rothkopf et al.

It is certified that error appears in the above-identified patent and that said Letters Patent is hereby corrected as shown below:

In the Claims

Claim 2, Column 19, Line 27:
Please delete "subenhanced" and insert --sub-enhanced--.

Signed and Sealed this
Twenty-sixth Day of March, 2024

Katherine Kelly Vidal
Director of the United States Patent and Trademark Office